US011209903B2

United States Patent
Leppänen et al.

(10) Patent No.: US 11,209,903 B2
(45) Date of Patent: Dec. 28, 2021

(54) RENDERING OF MEDIATED REALITY CONTENT

(71) Applicant: NOKIA TECHNOLOGIES OY, Espoo (FI)

(72) Inventors: Jussi Leppänen, Tampere (FI); Antti Eronen, Tampere (FI); Arto Lehtiniemi, Lempäälä (FI); Mikko-Ville Laitinen, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/256,856

(22) PCT Filed: Jun. 21, 2019

(86) PCT No.: PCT/IB2019/055271
§ 371 (c)(1),
(2) Date: Dec. 29, 2020

(87) PCT Pub. No.: WO2020/008293
PCT Pub. Date: Jan. 9, 2020

(65) Prior Publication Data
US 2021/0157406 A1     May 27, 2021

(30) Foreign Application Priority Data
Jul. 4, 2018   (EP) .................................... 18181575

(51) Int. Cl.
*G06F 3/01*     (2006.01)
*G06F 3/0346*     (2013.01)

(52) U.S. Cl.
CPC ............ *G06F 3/013* (2013.01); *G06F 3/0346* (2013.01)

(58) Field of Classification Search
CPC ............................... G06F 3/013; G06F 3/0346
See application file for complete search history.

(56) References Cited

U.S. PATENT DOCUMENTS

2018/0096519 A1*   4/2018   Tokubo ................. A63F 13/211

FOREIGN PATENT DOCUMENTS

WO    WO 2017/024177 A1    2/2017

OTHER PUBLICATIONS

Bruder et al., "Implementing Walking in Virtual Environments", Human Walking in Virtual Environments: Perception, Technology, and Applications, Chapter 10, Springer (Nov. 2013), pp. 221-240.
(Continued)

*Primary Examiner* — Kent W Chang
*Assistant Examiner* — Chayce R Bibbee
(74) *Attorney, Agent, or Firm* — Alston & Bird LLP

(57) ABSTRACT

An apparatus, method and computer instructions are provided. The apparatus comprises means for: mapping a virtual space to a real space; associating a user's real location in the real space with a virtual location of the user in the virtual space, such that a change in the user's real location causes a corresponding change in the user's virtual location; disassociating the user's real location with the user's virtual location, based at least in part on at least one user input; and changing, following disassociation of the user's real location with the user's virtual location, the user's virtual location without a corresponding change in the user's real location.

20 Claims, 12 Drawing Sheets

(56) References Cited

OTHER PUBLICATIONS

Bumble, "Locomotion in VR: Overview of Different Locomotion Methods on HTC Vive—YouTube", [online] [retrieved on Oct. 25, 2019]. Retrieved from the Internet: <URL:https://www.youtube.com/watch?v=p0YxzgQG2-E>. (dated Jun. 17, 2016), 3 pages.
Extended European Search Report for European Application No. 18181575.4 dated Jan. 24, 2019, 10 pages.
International Search Report and Written Opinion for Patent Cooperation Treaty Application No. PCT/IB2019/055271 dated Nov. 12, 2019, 14 pages.
Whitton et al., "Comparing VE Locomotion Interfaces", Proceedings of the 2005 IEEE Virtual Reality (VR), (Mar. 16, 2005), 8 pages.
Whitton et al., "Stepping-Driven Locomotion Interfaces", Human Walking in Virtual Environments: Perception, Technology, and Applications, Chapter 11, Springer (Nov. 2013), pp. 241-262.

* cited by examiner

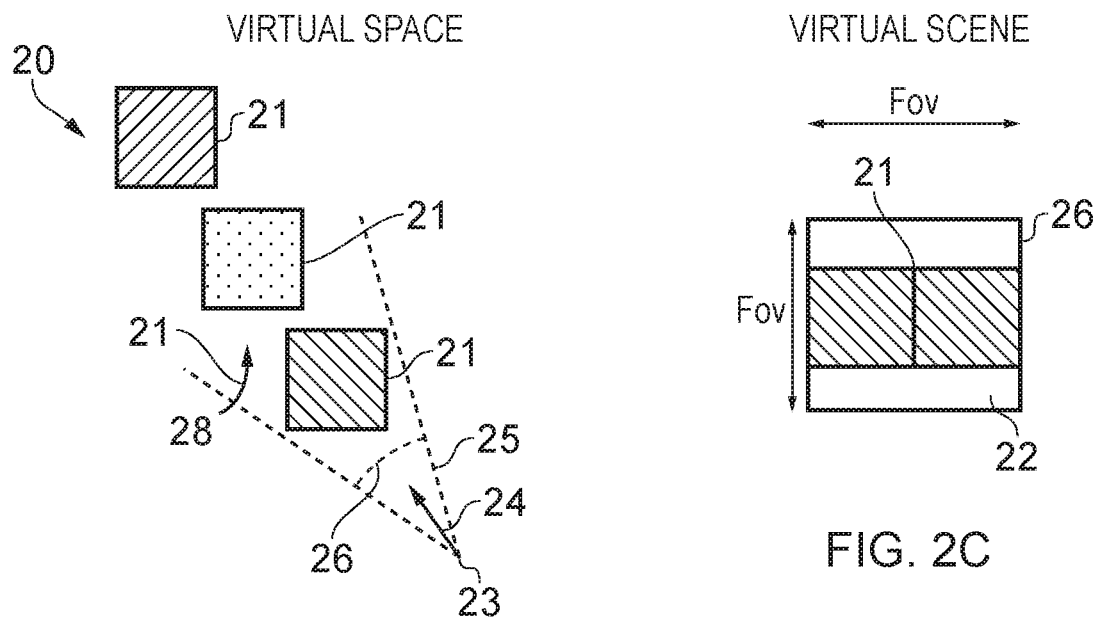
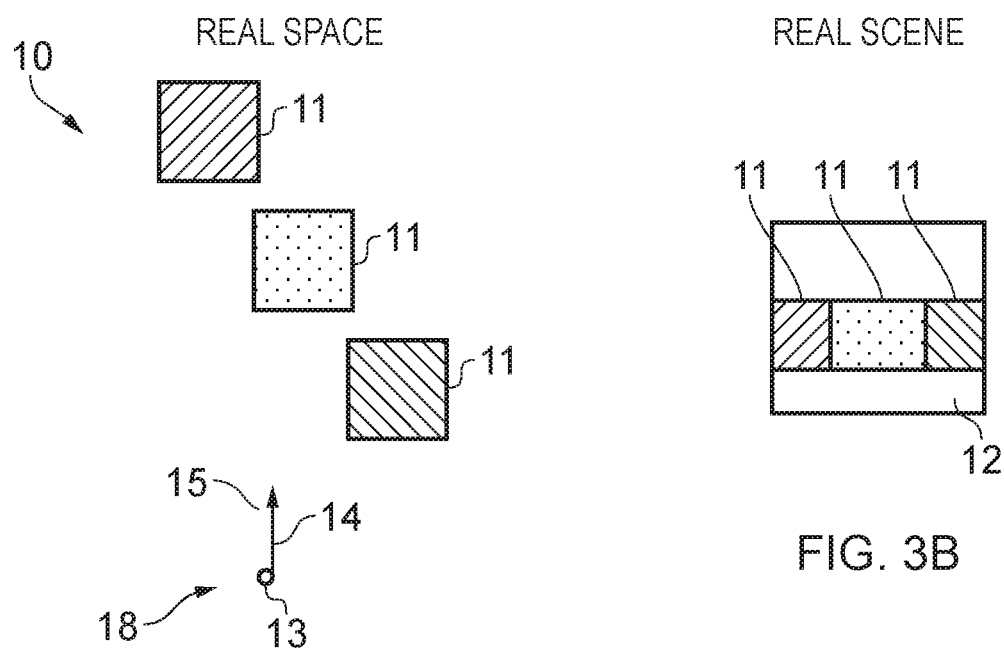

RENDERING OF MEDIATED REALITY CONTENT

CROSS-REFERENCE TO RELATED APPLICATIONS

This application is a national phase entry of International Application No. PCT/IB2019/055271, filed Jun. 21, 2019, which claims priority to European Application No. 18181575.4, filed Jul. 4, 2018, the entire contents of which are incorporated herein by reference.

TECHNOLOGICAL FIELD

Embodiments of the present disclosure relate to rendering of mediated reality content, such as virtual reality content or augmented reality content.

BACKGROUND

Mediated reality allows a user to visually experience a fully or partially artificial environment (a virtual space) as a virtual scene at least partially rendered by an apparatus to a user. The virtual scene is determined by a point of view of a user within the virtual space. The point of view of the user depends upon a virtual location of the user and a virtual orientation of the user.

First-person perspective mediation means that user's real point of view within a real space determines the point of view of the user within the virtual space, changing the virtual scene. The virtual orientation of the user depends on the real orientation of the user. A variation in the user's real orientation determines a variation in the virtual orientation of the user within the virtual space.

The virtual location of the user may depend on the real location of the user. If so, a variation in the user's real location determines a variation in the virtual location of the user within the virtual space. Exploration of the virtual space therefore requires movement in real space, which may be restrictive and/or become tiring after a while.

BRIEF SUMMARY

According to various, but not necessarily all, embodiments there is provided an apparatus comprising means for mapping a virtual space to a real space. The apparatus comprises means for associating a user's real location in the real space with a virtual location of the user in the virtual space, such that a change in the user's real location causes a corresponding change in the user's virtual location. The apparatus comprises means for disassociating the user's real location with the user's virtual location, based at least in part on at least one user input. The apparatus comprises means for tracking the user's virtual location over a period of time prior to the disassociation of the user's real location with the user's virtual location, wherein a history of the user's virtual location is formed, at least in part, from tracking the user's virtual location over the period of time. The apparatus comprises means for determining which portions of the virtual space are of particular interest to the user by analyzing the history of the user's virtual location. The apparatus comprises means for changing, following disassociation of the user's real location with the user's virtual location, the user's virtual location without a corresponding change in the user's real location, wherein the change in the user's virtual location, following the disassociation of the user's real location with the user's virtual location, is based at least in part on the portions of the virtual space determined to be of particular interest to the user.

The change in the user's virtual location, following the disassociation of the user's real location with the user's virtual location, may be based at least in part on a history of the user's virtual point of view prior to the disassociation.

The apparatus may further comprise means for tracking the user's virtual point of view prior to the disassociation of the user's real location with the user's virtual location. The history of the user's virtual point of view may be formed, at least in part, from tracking the user's virtual point of view over the period of time.

The apparatus may further comprise means for tracking virtual objects viewed by the user in the virtual space. The change in the user's virtual location, following the disassociation of the user's real location with the user's virtual location, may be based at least in part on which one or more virtual objects were viewed by the user prior to the disassociation.

The change in the user's virtual location may be based at least in part on a time period over which one or more virtual objects were viewed by the user prior to the disassociation.

The change in the user's virtual location, following the disassociation of the user's real location with the user's virtual location, may be based at least in part on user input provided after the disassociation.

The apparatus may further comprise means for causing an option to be provided to enable the user to choose to disassociate the user's real location with the user's virtual location. The decision to disassociate the user's real location with the user's virtual location may be based at least in part on user selection of the option.

A decision to disassociate the user's real location with the user's virtual location may be based, at least in part, on at least one user input from at least one motion sensor indicating that the user has ceased walking.

The apparatus may further comprise means for enabling, following disassociation of the user's real location with the user's virtual location and the change in the user's virtual location without a corresponding change in the user's real location, the user to further change the user's virtual location by providing user input without a corresponding further change in the user's real location.

The apparatus may further comprise at least one display for displaying a virtual visual scene of the virtual space.

According to various, but not necessarily all, embodiments there is provided a method. In the method, a virtual space is mapped to a real space. A user's real location in the real space is associated with a virtual location of the user in the virtual space, such that a change in the user's real location causes a corresponding change in the user's virtual location. A decision is made, based at least in part on at least one user input, to disassociate the user's real location with the user's virtual location. The user's virtual location is tracked over a period of time prior to the disassociation of the user's real location with the user's virtual location, wherein a history of the user's virtual location is formed, at least in part, from tracking the user's virtual location over the period of time. Which portions of the virtual space are of particular interest to the user are determined by analyzing the history of the user's virtual location. Following disassociation of the user's real location with the user's virtual location, the user's virtual location is changed without a corresponding change in the user's real location, wherein the change in the user's virtual location, following the disassociation of the user's real location with the user's virtual location, is based at least in part on the portions of the virtual space determined to be of particular interest to the user.

According to various, but not necessarily all, embodiments there is provided computer program instructions comprising instructions for mapping a virtual space to a real space. The instructions comprise instructions for associating a user's real location in the real space with a virtual location of the user in the virtual space, such that a change in the user's real location causes a corresponding change in the user's virtual location. The instructions comprise instructions for disassociating the user's real location with the user's virtual location, based at least in part on at least one user input. The instructions comprise instructions for tracking the user's virtual location over a period of time prior to the disassociation of the user's real location with the user's virtual location, wherein a history of the user's virtual location is formed, at least in part, from tracking the user's virtual location over the period of time. The instructions comprise instructions for determining which portions of the virtual space are of particular interest to the user by analyzing the history of the user's virtual location. The instructions comprise instructions for changing, following disassociation of the user's real location with the user's virtual location, the user's virtual location without a corresponding change in the user's real location, wherein the change in the user's virtual location, following the disassociation of the user's real location with the user's virtual location, is based at least in part on the portions of the virtual space determined to be of particular interest to the user.

The computer program instructions may be stored on a non-transitory computer readable medium.

According to various, but not necessarily all, embodiments there is provided an apparatus comprising at least one processor and at least one memory. The at least one memory stores computer program instructions for execution by the at least one processor. The computer program instructions are configured, when performed by the at least one processor, to cause the apparatus to perform at least: mapping a virtual space to a real space; associating a user's real location in the real space with a virtual location of user in the virtual space, such that a change in the user's real location causes a corresponding change in the user's virtual location; disassociating the user's real location with the user's virtual location, based at least in part on at least one user input; tracking the user's virtual location over a period of time prior to the disassociation of the user's real location with the user's virtual location, wherein a history of the user's virtual location is formed, at least in part, from tracking the user's virtual location over the period of time; determining which portions of the virtual space are of particular interest to the user by analyzing the history of the user's virtual location; and changing, following disassociation of the user's real location with the user's virtual location, the user's virtual location without a corresponding change in the user's real location, wherein the change in the user's virtual location, following the disassociation of the user's real location with the user's virtual location, is based at least in part on the portions of the virtual space determined to be of particular interest to the user.

According to various, but not necessarily all, embodiments there is provided an apparatus comprising means for mapping a virtual space to a real space. The apparatus comprises means for associating a user's real location in the real space with a virtual location of the user in the virtual space, such that a change in the user's real location causes a corresponding change in the user's virtual location. The apparatus comprises means for disassociating the user's real location with the user's virtual location, based at least in part on at least one user input. The apparatus comprises means for changing, following disassociation of the user's real location with the user's virtual location, the user's virtual location without a corresponding change in the user's real location.

The change in the user's virtual location, following the disassociation of the user's real location with the user's virtual location, may be based at least in part on a history of the user's virtual location prior to the disassociation.

The apparatus may further comprise means for tracking the user's virtual location over a period of time prior to the disassociation of the user's real location with the user's virtual location. The history of the user's virtual location may be formed, at least in part, from tracking the user's virtual location over the period of time.

According to various, but not necessarily all, embodiments there is provided a method. In the method, a virtual space is mapped to a real space. A user's real location in the real space is associated with a virtual location of the user in the virtual space, such that a change in the user's real location causes a corresponding change in the user's virtual location. A decision is made, based at least in part on at least one user input, to disassociate the user's real location with the user's virtual location. Following disassociation of the user's real location with the user's virtual location, the user's virtual location is changed without a corresponding change in the user's real location.

The change in the user's virtual location, following the disassociation of the user's real location with the user's virtual location, may be based at least in part on a history of the user's virtual location prior to the disassociation.

The method may further comprise tracking the user's virtual location over a period of time prior to the disassociation of the user's real location with the user's virtual location. The history of the user's virtual location may be formed, at least in part, from tracking the user's virtual location over the period of time.

According to various, but not necessarily all, embodiments there is provided computer program instructions comprising instructions for mapping a virtual space to a real space. The instructions comprise instructions for associating a user's real location in the real space with a virtual location of the user in the virtual space, such that a change in the user's real location causes a corresponding change in the user's virtual location. The instructions comprise instructions for disassociating the user's real location with the user's virtual location, based at least in part on at least one user input. The instructions comprise instructions for changing, following disassociation of the user's real location with the user's virtual location, the user's virtual location without a corresponding change in the user's real location.

The computer program instructions may be stored on a non-transitory computer readable medium.

According to various, but not necessarily all, embodiments there is provided an apparatus comprising at least one processor and at least one memory. The at least one memory stores computer program instructions for execution by the at least one processor. The computer program instructions are configured, when performed by the at least one processor, to cause the apparatus to perform at least: mapping a virtual space to a real space; associating a user's real location in the real space with a virtual location of user in the virtual space, such that a change in the user's real location causes a corresponding change in the user's virtual location; disassociating the user's real location with the user's virtual location, based at least in part on at least one user input; and changing, following disassociation of the user's real location with the user's virtual location, the user's virtual location without a corresponding change in the user's real location.

According to various, but not necessarily all, embodiments there is provided examples as claimed in the appended claims.

BRIEF DESCRIPTION

Some example embodiments will now be described with reference to the accompanying drawings in which:

FIGS. 1A-1C and 2A-2C illustrate examples of mediated reality in which FIGS. 1A, 1B, 1C illustrate, from a common top perspective, the same virtual visual space and different points of view and FIGS. 2A, 2B, 2C illustrate a virtual visual scene from the perspective of the respective points of view;

FIG. 3A illustrates an example of a real space and FIG. 3B illustrates an example of a real visual scene;

Figure 15B:
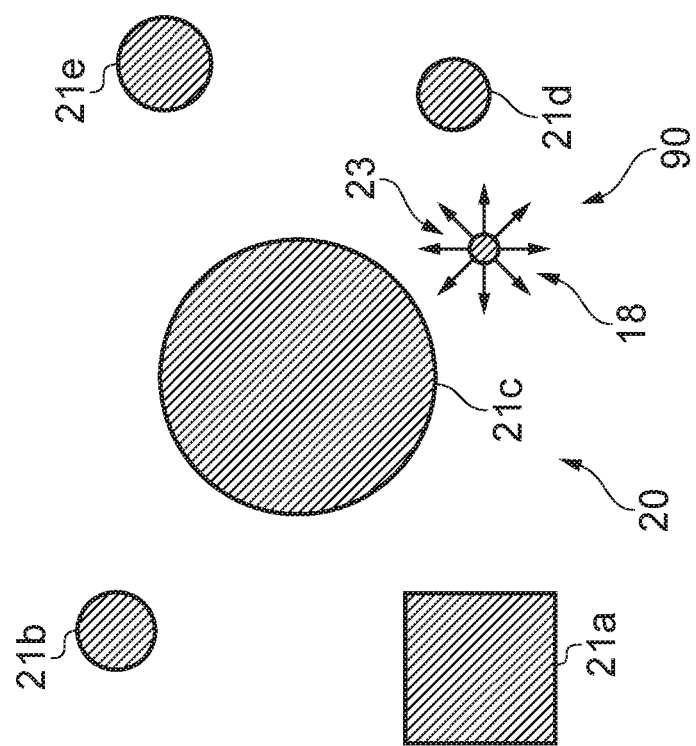
Figure 15A:
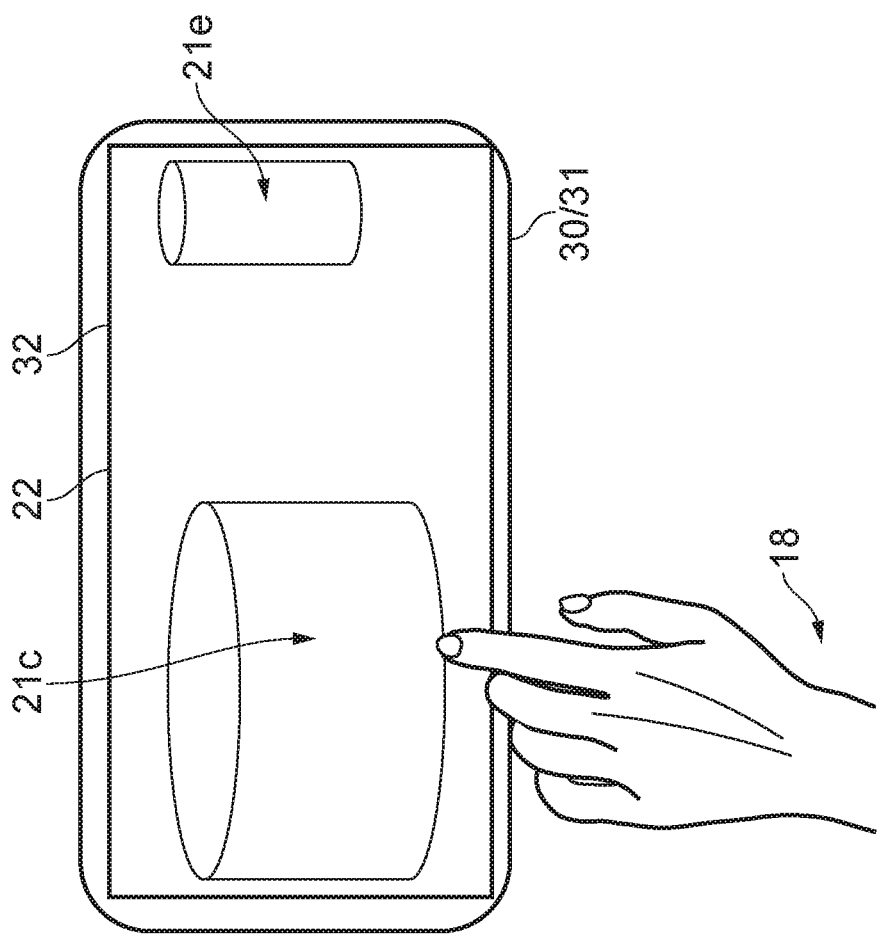
Figure 16B:
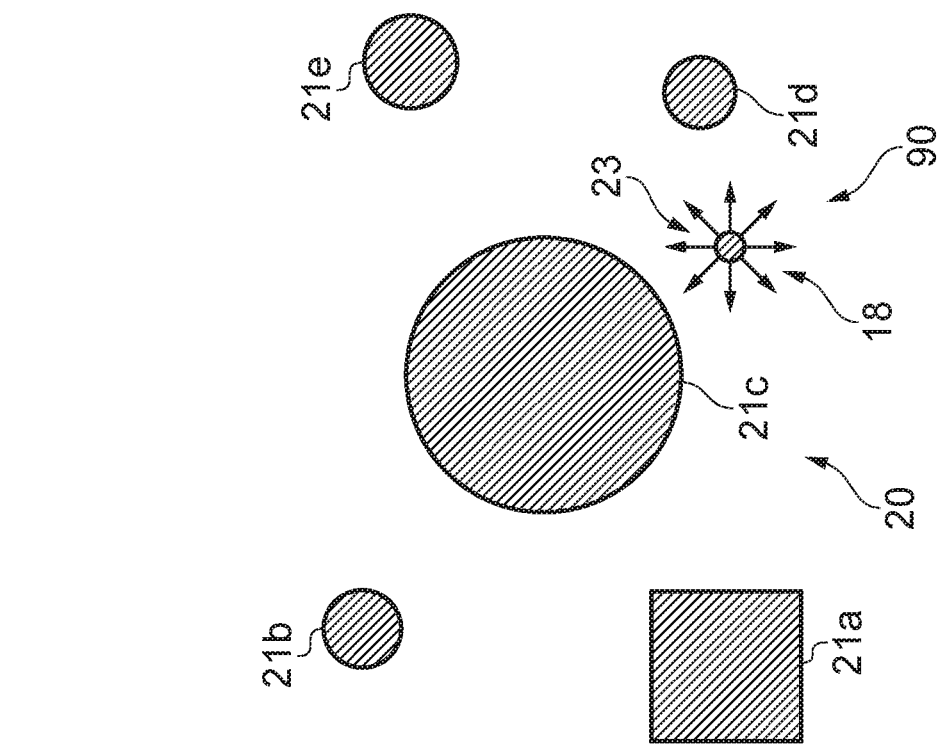
Figure 16A:
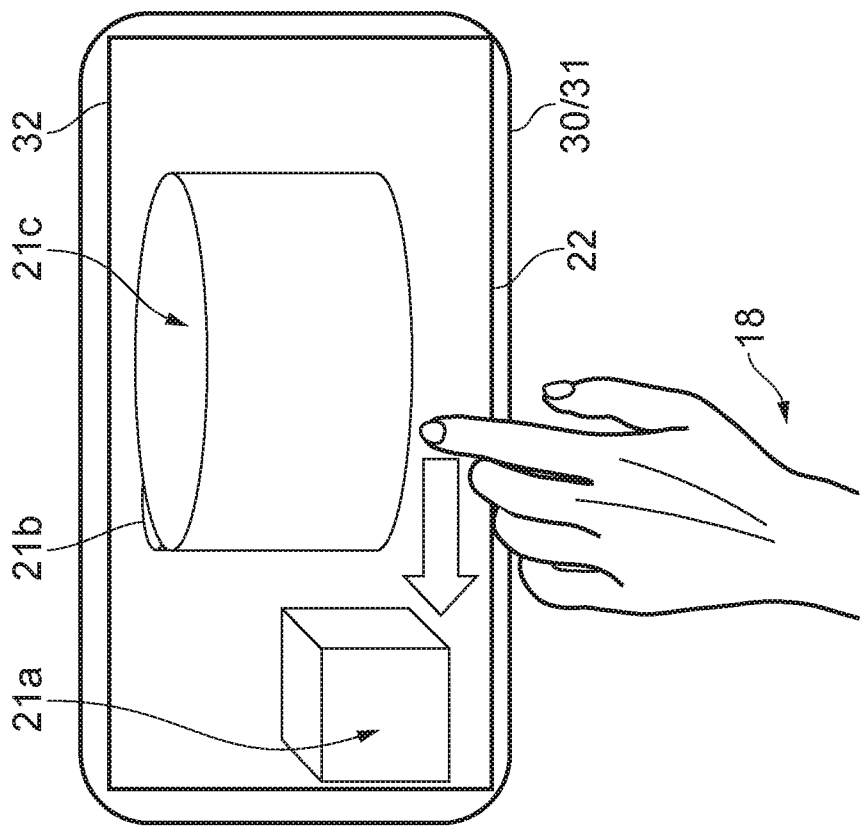

FIG. 15A illustrates the display of the apparatus displaying a virtual scene of the virtual space from a location indicated in the plan view of the virtual space illustrated in FIG. 15B; and FIG. 16A illustrates the display of the apparatus displaying a virtual scene of the virtual space from a location indicated in the plan view of the virtual space illustrated in FIG. 16B, where the user has changed the orientation of his virtual point of view relative to FIG. 15A.

DEFINITIONS a "point of view" is a perspective from a particular location and a particular orientation in space;

an "artificial environment" may be something that has been recorded or generated.

a "virtual visual space" refers to a fully or partially artificial environment that may be viewed, which may be three dimensional;

a "virtual visual scene" refers to a representation of the virtual visual space viewed from a particular point of view within the virtual visual space;

"virtual visual object" is a visible virtual object within a virtual visual scene;

an "aural space" (or "virtual aural space") refers to an arrangement of audio sources in a three-dimensional space. A virtual aural space may be defined in relation to recording sounds (a recorded virtual aural space) and in relation to rendering sounds (a rendered virtual aural space);

an "aural scene" (or "virtual aural scene") refers to a representation of the virtual aural space listened to from a particular point of view within the virtual aural space;

an "aural object" refers to audio source that may be located within the virtual aural space. A source audio object represents an audio source within the virtual aural space, in contrast to an audio source associated with an object in the virtual visual space. A recorded aural object represents sounds recorded at a particular microphone or position. A rendered aural object represents sounds rendered from a particular position;

"virtual space" may mean a virtual visual space, mean a virtual aural space or mean a combination of a virtual visual space and corresponding virtual aural space. In some examples, the virtual space may extend horizontally up to 360° and may extend vertically up to 180°;

"virtual scene" may mean a virtual visual scene, mean a virtual aural scene or mean a combination of a virtual visual scene and corresponding virtual aural scene;

a "virtual object" is an object within a virtual scene, it may be an artificial virtual object (e.g. a computer-generated virtual object) or it may be an image of a real object in a real space that is live or recorded. It may be a virtual aural object and/or a virtual visual object;

a "virtual position" is a position within a virtual space. It may be defined using a virtual location and/or a virtual orientation. It may be considered to be a movable 'point of view'.

"correspondence" or "corresponding" when used in relation to a virtual aural space and a virtual visual space means that the virtual aural space and virtual visual space are time and space aligned, that is they are the same space at the same time;

"correspondence" or "corresponding" when used in relation to a virtual aural scene and a virtual visual scene (or visual scene) means that the virtual aural space and virtual visual space (or visual scene) are corresponding and a notional (virtual) listener whose point of view defines the virtual aural scene and a notional (virtual) viewer whose point of view defines the virtual visual scene (or visual scene) are at the same location and orientation, that is they have the same point of view (same virtual position);

"real space" (or "physical space") refers to a real environment, which may be three dimensional;

"real scene" refers to a representation of the real space from a particular point of view within the real space;

"real visual scene" refers to a representation of the real space viewed from a particular point of view within the real space;

"mediated reality" in this document refers to a user visually experiencing a fully or partially artificial environment (a virtual space) as a virtual scene at least partially rendered by an apparatus to a user. The virtual scene is determined by a point of view within the virtual space. Displaying the virtual scene means providing it in a form that can be perceived by the user;

"augmented reality" in this document refers to a form of mediated reality in which a user experiences a partially artificial environment (a virtual space) as a virtual scene comprising a real scene of a physical real world environment (real space) supplemented by one or more visual or audio elements rendered by an apparatus to a user. The term augmented reality implies a mixed reality or hybrid reality and does not necessarily imply the degree of virtuality (vs reality) or the degree of mediality;

"virtual reality" in this document refers to a form of mediated reality in which a user experiences a fully artificial environment (a virtual visual space) as a virtual scene displayed by an apparatus to a user;

"virtual content" is content, additional to real content from a real scene, if any, that enables mediated reality by, for example, providing one or more artificial virtual objects;

"mediated reality content" is content which enables a user to visually experience a fully or partially artificial environment (a virtual space) as a virtual visual scene. Mediated reality content could include interactive content such as a video game or non-interactive content such as motion video;

"augmented reality content" is a form of mediated reality content which enables a user to visually experience a partially artificial environment (a virtual space) as a virtual visual scene. Augmented reality content could include interactive content such as a video game or non-interactive content such as motion video;

"virtual reality content" is a form of mediated reality content which enables a user to visually experience a fully artificial environment (a virtual space) as a virtual visual scene. Virtual reality content could include interactive content such as a video game or non-interactive content such as motion video;

"perspective-mediated" as applied to mediated reality, augmented reality or virtual reality means that user actions determine the point of view within the virtual space, changing the virtual scene;

"first person perspective-mediated" as applied to mediated reality, augmented reality or virtual reality means perspective mediated with the additional constraint that the user's real point of view (location and/or orientation) determines the point of view within the virtual space;

"third person perspective-mediated" as applied to mediated reality, augmented reality or virtual reality means perspective mediated with the additional constraint that the user's real point of view does not determine the point of view within the virtual space;

"user interactive" as applied to mediated reality, augmented reality or virtual reality means that user actions at least partially determine what happens within the virtual space;

"displaying" means providing in a form that is perceived visually (viewed) by the user. "rendering" means providing in a form that is perceived by the user;

"notional listener" defines the point of view in virtual space used to generate a perspective-mediated virtual aural scene, irrespective of whether or not a user is actually listening; and "notional viewer" defines the point of view in virtual space used to generate a perspective-mediated visual scene, irrespective of whether or not a user is actually viewing.

DESCRIPTION

FIGS. 1A-1C and 2A-2C illustrate examples of mediated reality. The mediated reality may be augmented reality or virtual reality.

Figure 1A:
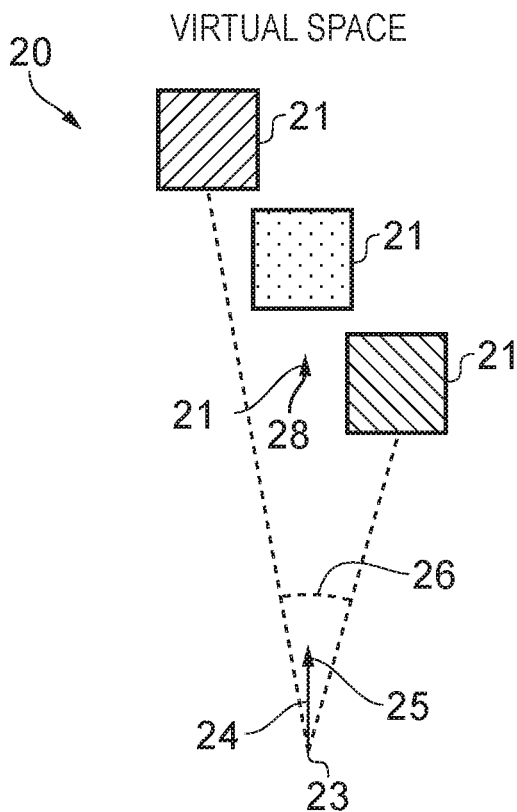
Figure 1B:
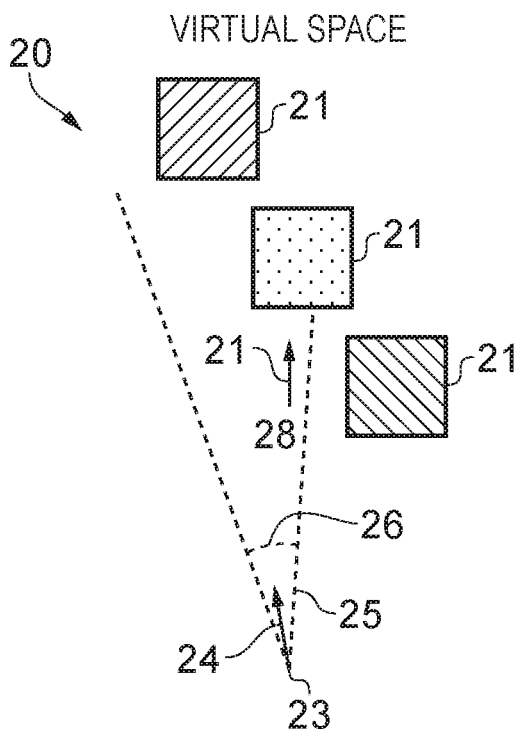

FIGS. 1A, 1B, 1C illustrate the same virtual visual space 20 comprising the same virtual visual objects 21, however, each FIG illustrates a different virtual point of view 24 of a user. The virtual location 23 and virtual direction 25 of a virtual point of view 24 of the user can change independently. The direction 25 but not the location 23 of the virtual point of view 24 of the user changes from FIG. 1A to FIG. 1B. The direction 25 and the location 23 of the virtual point of view 24 of the user changes from FIG. 1B to FIG. 1C.

Figure 2A:
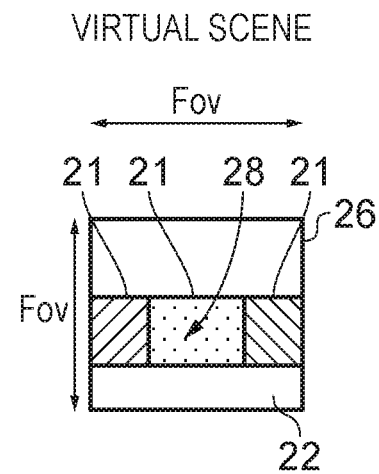
Figure 2B:
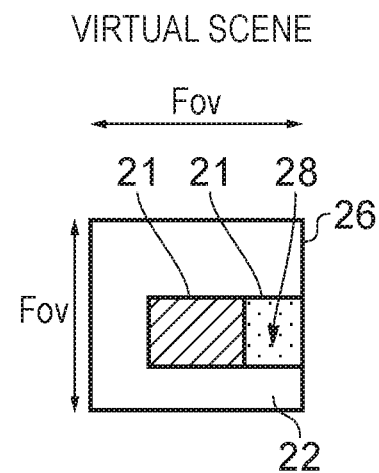

FIGS. 2A, 2B, 2C illustrate a virtual visual scene 22 from the perspective of the different virtual points of view 24 of the user of respective FIGS. 1A, 1B, 1C. The virtual visual scene 22 is determined by the virtual point of view 24 of the user within the virtual visual space 20 and a field of view 26. The virtual visual scene 22 is at least partially displayed to the user.

The virtual visual scenes 22 illustrated may be mediated reality scenes, virtual reality scenes or augmented reality scenes. A virtual reality scene displays a fully artificial virtual visual space 20. An augmented reality scene displays a partially artificial, partially real virtual visual space 20.

The mediated reality, augmented reality or virtual reality may be user interactive-mediated. In this case, user actions at least partially determine what happens within the virtual visual space 20. This may enable interaction with a virtual (visual) object 21 such as a visual element 28 within the virtual visual space 20. For example, the user may be able to select and move the virtual object 21.

The mediated reality, augmented reality or virtual reality may be perspective-mediated. In this case, user actions determine the virtual point of view 24 of the user within the virtual visual space 20, changing the virtual visual scene 22. For example, as illustrated in FIGS. 1A, 1B, 1C a virtual location 23 of the virtual point of view 24 of the user within the virtual visual space 20 may be changed and/or a direction or orientation 25 of the virtual point of view 24 of the user 18 within the virtual visual space 20 may be changed. If the virtual visual space 20 is three-dimensional, the virtual location 23 of the virtual point of view 24 of the user has three degrees of freedom (e.g. up/down, forward/back, left/right; otherwise known as heave, surge and sway) and the direction 25 of the virtual point of view 24 of the user within the virtual visual space 20 has three degrees of freedom (e.g. roll, pitch, yaw). The virtual point of view 24 of the user may be continuously variable in virtual location 23 and/or direction 25 and user action then changes the location and/or direction of the virtual point of view 24 of the user continuously. Alternatively, the virtual point of view 24 of the user may have discrete quantised locations 23 and/or discrete quantised directions 25 and user action switches by discretely jumping between the allowed locations 23 and/or directions 25 of the virtual point of view 24 of the user.

FIG. 3A illustrates an example of a real space 10 comprising real objects 11 that partially correspond with the virtual visual space 20 of FIG. 1A. In this example, each real object 11 in the real space 10 has a corresponding virtual object 21 in the virtual visual space 20, however, each virtual object 21 in the virtual visual space 20 does not have a corresponding real object 11 in the real space 10. In this example, one of the virtual objects 21, the computer-generated visual element 28, is an artificial virtual object 21 that does not have a corresponding real object 11 in the real space 10.

A linear mapping may exist between the real space 10 and the virtual visual space 20 and the same mapping exists between each real object 11 in the real space 10 and its corresponding virtual object 21. The relative relationship of the real objects 11 in the real space 10 is therefore the same as the relative relationship between the corresponding virtual objects 21 in the virtual visual space 20.

FIG. 3B illustrates an example of a real visual scene 12 that partially corresponds with the virtual visual scene 22 of FIG. 1A, it includes real objects 11 but not artificial virtual objects. The real visual scene is from a point of view 14 corresponding to the virtual point of view 24 of the user in the virtual visual space 20 of FIG. 1A. The real visual scene content is determined by that corresponding virtual point of view 24 of the user and the field of view 26 in virtual space 20 (point of view 14 in real space 10).

FIG. 2A may be an illustration of an augmented reality version of the real visual scene 12 illustrated in FIG. 3B. The virtual visual scene 22 comprises the real visual scene 12 of the real space 10 supplemented by one or more visual elements 28 displayed by an apparatus to the user. The visual elements 28 may be a computer-generated visual element. In a see-through arrangement, the virtual visual scene 22 comprises the actual real visual scene 12 which is seen through a display of the supplemental visual element(s) 28. In a see-video arrangement, the virtual visual scene 22 comprises a displayed real visual scene 12 and displayed supplemental visual element(s) 28. The displayed real visual scene 12 may be based on an image from a single virtual point of view 24 of the user or on multiple images from different points of view at the same time, processed to generate an image from a single virtual point of view 24 of the user.

In augmented reality, the virtual content 28 is one or more virtual (visual) objects 21. The virtual scene 22 comprises the real scene 12, augmented or not by virtual content in dependence upon the virtual point of view 24 of the user 18.

In virtual reality, the virtual content 28 is the whole of the virtual scene and all virtual objects 21 within it. The virtual scene 22 comprises only the virtual content 28 determined in dependence upon the virtual point of view 24 of the user.

Figure 4:
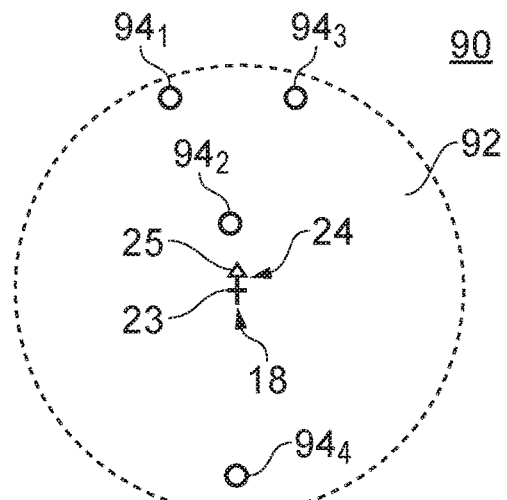
FIG. 4 illustrates, from a top perspective, an example of a virtual aural space 90 that corresponds to the virtual visual space.

FIG. 4 illustrates, from a top perspective, an example of a virtual aural space 90 that corresponds to the virtual visual space 20. FIG. 4 is a two-dimensional projection or cross-section of the three-dimensional virtual aural space 90. The virtual aural space 90 defines a virtual aural scene 92.

In some but not necessarily all examples, the virtual visual space 20 and the virtual aural space 90 may be corresponding and form a combined virtual space 90, 20. "Correspondence" or "corresponding" when used in relation to a virtual aural space and a virtual visual space means that the virtual aural space 90 and virtual visual space 20 are time and space aligned as combined virtual space 90, 20, that is they are the same space at the same time.

The correspondence between virtual visual space 20 and virtual aural space 90 results in correspondence between the virtual visual scene 22 and the virtual aural scene 92 to form a combined virtual scene 92, 22. "Correspondence" or "corresponding" when used in relation to a virtual aural scene 92 and a virtual visual scene 22 means that the virtual aural space 90 and virtual visual space 20 are corresponding and a notional listener (user) whose point of view defines the virtual aural scene 92 and a notional viewer (user) whose point of view defines the virtual visual scene 22 are at the same location and orientation, that is they are the same virtual point of view 24 of the same user.

In FIG. 4, the virtual aural space 90 and the virtual visual space 20 form a combined virtual space 90, 20. The virtual aural space 90 is an arrangement of audio sources 94 in a three-dimensional space. In this example, the virtual aural space 90 is a rendered virtual aural space and the audio sources 94 comprise aural objects.

The virtual aural space 90 defines a virtual aural scene 92 that corresponds to the virtual visual scene 22. The virtual aural scene 92 and the virtual visual scene 22 form a combined virtual scene 92, 22. The virtual aural scene 92 is a representation of the virtual aural space 90 listened to from a particular virtual point of view 24 of the user 18 within the virtual aural space 90. The virtual aural scene 92 is first person perspective-mediated. The user's real point of view 14 determines the virtual point of view 24 within the virtual aural space, changing the virtual aural scene 92.

In this example, the virtual point of view 24 of the user 18 within the virtual aural space 90 corresponds to the virtual point of view 24 of the user 18 within the virtual visual space 20 and the same label is used. The virtual scene 92, 22 is first person perspective-mediated. The user's real point of view 14 determines the virtual point of view 24 within the combined virtual space 90, 20, changing the combined virtual scene 92, 22.

Correspondence in this sense means that there is a one-to-one mapping between the virtual aural space 90 and the virtual visual space 20 such that a position in the virtual aural space 90 has a corresponding position in the virtual visual space 20 and a position in the virtual visual space 20 has a corresponding position in the virtual aural space 90. Correspondence in this sense means that there is a one-to-one mapping between the virtual aural scene 92 and the virtual visual scene 22 such that a position in the virtual aural scene 92 has a corresponding position in the virtual visual scene 22 and a position in the virtual visual scene 22 has a corresponding position in the virtual aural scene 92. Corresponding also means that the coordinate system of the virtual aural space 90/virtual aural scene 92 and the coordinate system of the virtual visual space 20/virtual visual scene 22 are in register such that an object is positioned as an aural object in the virtual aural scene and as a visual object in the visual scene at the same common position from the perspective of the user 18.

In this illustrated example, the user actions determine the virtual point of view 24 of the user 18 within the virtual aural space 90 (and virtual visual space 20), changing the virtual aural scene 92 and the virtual visual scene 22 simultaneously. For example, a virtual location 23 of the virtual point of view 24 of the user 18 within the virtual space 92, 20 may be changed and/or a direction or orientation 25 of the virtual point of view 24 of the user 18 within the virtual space 92, 20 may be changed. If the virtual space 92, 20 is three-dimensional, the virtual location 23 of the virtual point of view 24 of the user 18 has three degrees of freedom e.g. up/down, forward/back, left/right and the direction 25 of the virtual point of view 24 of the user 18 within the virtual visual space 20 has three degrees of freedom e.g. roll, pitch, yaw. The virtual point of view 24 of the user 18 may be continuously variable in virtual location 23 and/or direction 25 and user action then changes the location and/or direction of the virtual point of view 24 of the user 18 continuously. Alternatively, the virtual point of view 24 of the user 18 may have discrete quantised locations 23 and/or discrete quantised directions 25 and user action switches by discretely jumping between the allowed locations 23 and/or directions 25 of the virtual point of view 24 of the user.

The functionality that enables control of a virtual visual space 20 and the virtual visual scene 26 dependent upon the virtual visual space 20 and the functionality that enables control of a virtual aural space and the virtual aural scene 92 dependent upon the virtual aural space 90 may be provided by the same apparatus, system, method or computer program.

Figure 5:
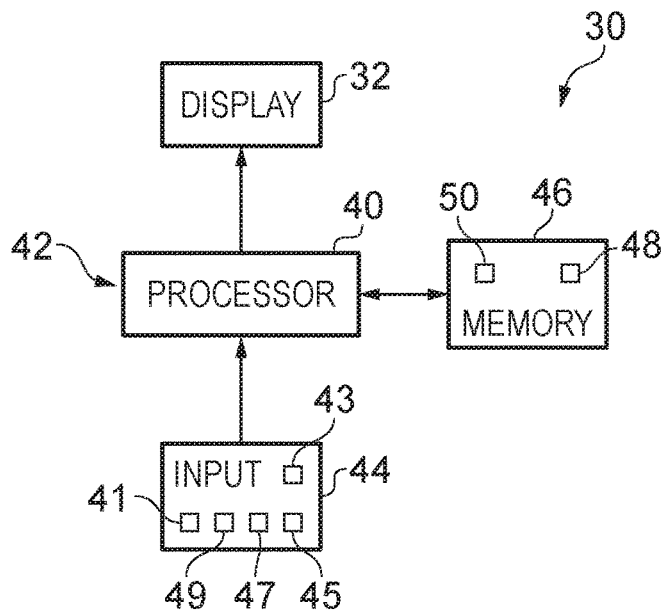
FIG. 5 illustrates an example of an apparatus that is operable to enable mediated reality and/or augmented reality and/or virtual reality.

FIG. 5 illustrates an example of an apparatus 30 that is operable to enable mediated reality and/or augmented reality and/or virtual reality.

The apparatus 30 comprises a rendering device or devices 32, which may render information to a user visually via a display, aurally via one or more audio outputs 32, for example via loudspeakers, and/or haptically via a haptic device.

The audio output device 32 may comprise one or more spatially distributed audio sources. For example, binaural loudspeakers may be separated in a head mounted audio (HMA) device, loudspeakers may be spatially separated in a sound bar or in a distributed loudspeaker arrangement e.g. 5.1 or 7.1 surround sound.

The display 32 is for providing at least parts of the virtual visual scene 22 to a user 18 in a form that is perceived visually by the user 18. The display 32 may be a visual display that provides light that displays at least parts of the virtual visual scene 22 to a user 18. Examples of visual displays include liquid crystal displays, organic light emitting displays, emissive, reflective, transmissive and transflective displays, direct retina projection display, near eye displays etc. The display 32 may be a head-mounted display (HMD), a hand-portable display or television display or some other display.

The rendering device or devices 32 are controlled in this example but not necessarily all examples by a controller 42.

Implementation of a controller 42 may be as controller circuitry. The controller 42 may be implemented in hardware alone, have certain aspects in software including firmware alone or can be a combination of hardware and software (including firmware).

As illustrated in FIG. 5 the controller 42 may comprise a processor 40 configured to load computer program instructions 48 from a memory 46. The controller 42 may be implemented using instructions that enable hardware functionality, for example, by using executable computer program instructions 48 in a general-purpose or special-purpose processor 40 that may be stored on a computer readable storage medium (disk, memory etc.) to be executed by such a processor 40.

The processor 40 is configured to read from and write to the memory 46. The processor 40 may also comprise an output interface via which data and/or commands are output by the processor 40 and an input interface via which data and/or commands are input to the processor 40.

The memory 46 stores at least a computer program 48 comprising computer program instructions (computer program code) that controls the operation of the apparatus 30 when loaded into the processor 40. The computer program instructions, of the computer program 48, provide the logic and routines that enables the apparatus to perform at least the methods illustrated in FIGS. 6A & 6B. The processor 40 by reading the memory 46 is able to load and execute the computer program 48.

The apparatus 30 may enable user-interactive mediation for mediated reality and/or augmented reality and/or virtual reality. The input circuitry 44 tracks (detects over time) user actions using user input 43. These user actions are used by the controller 42 to determine what happens within the virtual space. This may enable interaction with a visual element 28 within the virtual visual space 20.

The apparatus 30 may enable perspective mediation for mediated reality and/or augmented reality and/or virtual reality. The input circuitry 44 tracks (detects over time) user actions. These user actions are used by the controller 42 to determine the virtual point of view 24 of the user 18 within the virtual space, changing the virtual scene. The virtual point of view 24 of the user 18 may be continuously variable in location and/or direction and user action changes the location and/or direction of the virtual point of view 24 of the user 18. Alternatively, the virtual point of view 24 of the user 18 may have discrete quantised locations and/or discrete quantised directions and user action switches by jumping to the next location and/or direction of the virtual point of view 24 of the user 18.

The apparatus 30 may enable first person perspective for mediated reality, augmented reality or virtual reality. The input circuitry 44 detects the user's real point of view 14 using point of view sensor 45. The user's real point of view is used by the controller 42 to determine his virtual point of view 24 within the virtual space 20, changing the virtual scene 22. Referring back to FIG. 3A, a user 18 has a real point of view 14. The real point of view may be changed by the user 18. For example, a real location 13 of the real point of view 14 is the location of the user 18 and can be changed by changing the physical location 13 of the user 18. For example, a real direction 15 of the real point of view 14 is the direction in which the user 18 is looking and can be changed by changing the real direction of the user 18. The real direction 15 may, for example, be changed by a user 18 changing an orientation of their head or viewpoint and/or a user changing a direction of their gaze.

A head-mounted apparatus 30, may be used to enable first-person perspective mediation by measuring a change in location and/or a change in orientation of the user's head and/or a change in the user's direction of gaze. The head-mounted apparatus 30 may, for example, operate as a head mounted audio (HMA) device, a head mounted display (HMD) device or a combined head mounted display and audio (HMDA) device.

In some but not necessarily all examples, the apparatus 30 comprises as part of the input circuitry 44 one or more point of view sensors 45 for determining changes in the real point of view.

For example, positioning technology such as GPS, HAIP (high-accuracy indoor positioning), triangulation (trilateration) by transmitting to multiple receivers and/or receiving from multiple transmitters, acceleration detection and integration may be used to determine a new physical location 13 of the user 18 and real point of view 14.

For example, one or more motion sensors (such as one or more accelerometers, electronic gyroscopes, electronic compasses and/or one or more image sensors) may be used to determine a change in an orientation of a user's head or viewpoint (roll, pitch and yaw) and a consequential change in the real direction 15 of the real point of view 14. The point of view sensor(s) 45 may also be configured to track translational movement of the apparatus 30 (and therefore the real/physical location 13) of the apparatus in three dimensions (up/down, forward/back and left/right; otherwise known as heave, surge and sway). In this regard, the point of view sensor(s) 45 may be used to provide inside-out tracking for the apparatus 30.

Pupil tracking technology, based for example on computer vision, may for example be used to track movement of a user's eye or eyes and therefore determine a direction of a user's gaze and consequential changes in the real direction 15 of the real point of view 14.

The apparatus 30 may comprise as part of the input circuitry 44 one or more image sensors 47 for imaging the real space 10 that are part of or different from the point of view sensor(s) 45.

An example of an image sensor 47 is a digital image sensor that is configured to operate as a camera. Such a camera may be operated to record static images and/or video images. In some, but not necessarily all embodiments, cameras may be configured in a stereoscopic or other spatially distributed arrangement so that the real space 10 is viewed from different perspectives. This may enable the creation of a three-dimensional image and/or processing to establish depth, for example, via the parallax effect.

In some, but not necessarily all embodiments, the input circuitry 44 comprises depth sensors 49. A depth sensor 49 may comprise a transmitter and a receiver. The transmitter transmits a signal (for example, a signal a human cannot sense such as ultrasound or infrared light) and the receiver receives the reflected signal. Using a single transmitter and a single receiver some depth information may be achieved via measuring the time of flight from transmission to reception. Better resolution may be achieved by using more transmitters and/or more receivers (spatial diversity). In one example, the transmitter is configured to 'paint' the real space 10 with structured light, preferably invisible light such as infrared light, with a spatially dependent pattern. Detection of a certain pattern by the receiver allows the real space 10 to be spatially resolved. The distance to the spatially resolved portion of the real space 10 may be determined by time of flight and/or stereoscopy (if the receiver is in a stereoscopic position relative to the transmitter).

In some but not necessarily all embodiments, the input circuitry 44 may comprise communication circuitry 41 in addition to or as an alternative to one or more of the image sensors 47 and the depth sensors 49. Such communication circuitry 41 may communicate with one or more remote image sensors 47 in the real space 10 and/or with remote depth sensors 49 in the real space 10.

In this regard, the depth sensor(s) 49 and/or the communication circuitry 41 may be used to provide outside-in tracking of the apparatus 30, which might be provided as an alternative to, or in addition to, inside-out tracking of the apparatus 30.

Figure 6A:
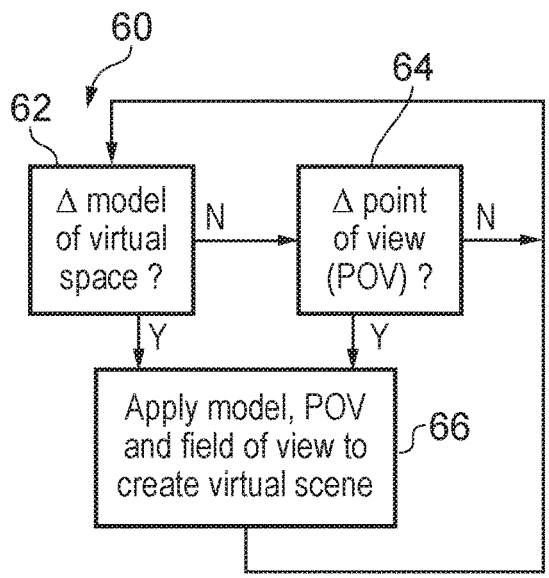
FIG. 6A illustrates an example of a method for enabling mediated reality and/or augmented reality and/or virtual reality.

The apparatus 30 may enable mediated reality and/or augmented reality and/or virtual reality, for example using the method 60 illustrated in FIG. 6A or a similar method. The controller 42 stores and maintains a model 50 of the virtual space 20 including a mapping between the physical space 10 and the virtual space 10.

The model may be provided to the controller 42 or determined by the controller 42. For example, sensors in input circuitry 44 may optionally be used to create overlapping depth maps of the real space from different points of view, virtual content is added, to produce and change the model.

Each real location 13 in the physical space 10, through the mapping, has a corresponding virtual location 23 in the virtual space 20 and vice versa. Each real orientation 15 in the physical space 10, through the mapping, has a corresponding virtual orientation 25 in the virtual space 20 and vice versa.

There are many different technologies that may be used to create a depth map. An example of a passive system, used in the Kinect™ device, is when an object is painted with a non-homogenous pattern of symbols using infrared light and the reflected light is measured using multiple cameras and then processed, using the parallax effect, to determine a location of the object.

At block 62 it is determined whether or not the model of the virtual space 20 has changed. If the model of the virtual visual space 20 has changed the method moves to block 66. If the model of the virtual visual space 20 has not changed the method moves to block 64.

At block 64 it is determined whether or not the virtual point of view 24 of the user 18 in the virtual visual space 20 has changed. If the virtual point of view 24 of the user 18 has changed the method moves to block 66. If the virtual point of view 24 of the user 18 has not changed the method returns to block 62.

At block 66, a two-dimensional projection of the three-dimensional virtual visual space 20 is taken from the virtual location 23 and in the direction 25 defined by the current virtual point of view 24 of the user 18. The projection is limited by the field of view 26 to produce the virtual visual scene 22. The projection may also define the virtual aural scene. The method then returns to block 62.

Figure 6B:
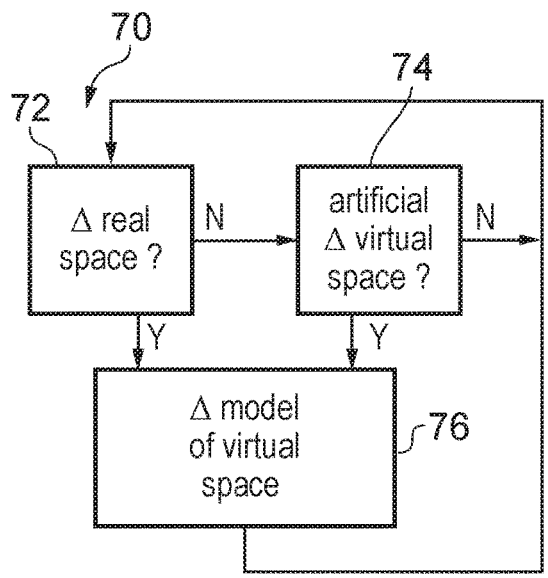
FIG. 6B illustrates an example of a method for updating a model of the virtual visual space for augmented reality.

FIG. 6B illustrates an example of a method 70 for updating a model of the virtual visual space 20 for augmented reality. Where the apparatus 30 enables augmented reality, the virtual visual space 20 comprises objects 11 from the real space 10 and also visual elements 28 not present in the real space 10. The combination of such visual elements 28 may be referred to as the artificial virtual visual space.

At block 72 it is determined whether or not the real space 10 has changed. If the real space 10 has changed the method moves to block 76. If the real space 10 has not changed the method moves to block 74. Detecting a change in the real space 10 may be achieved at a pixel level using differencing and may be achieved at an object level using computer vision to track objects as they move.

At block 74 it is determined whether or not the artificial virtual visual space has changed. If the artificial virtual visual space has changed the method moves to block 76. If the artificial virtual visual space has not changed the method returns to block 72. As the artificial virtual visual space is generated by the controller 42 changes to the visual elements 28 are easily detected.

At block 76, the model of the virtual visual space 20 is updated.

The blocks illustrated in FIGS. 6A & 6B may represent steps in a method and/or sections of code in the computer program 48. The illustration of a particular order to the blocks does not necessarily imply that there is a required or preferred order for the blocks and the order and arrangement of the block may be varied. Furthermore, it may be possible for some blocks to be omitted.

Figure 7A:
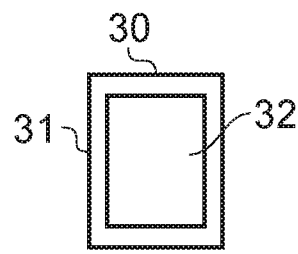
FIGS. 7A and 7B illustrate examples of apparatus that enable display of at least parts of the virtual visual scene to a user.
Figure 7B:
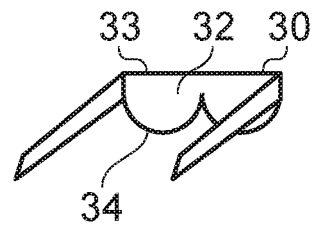

FIGS. 7A and 7B illustrate examples of apparatus 30 that enable display of at least parts of the virtual visual scene 22 to a user and rendering of audio to a user. In this regard, the apparatus 30 is configured to enable a user to experience mediated reality content, such as virtual reality content or augmented reality content.

FIG. 7A illustrates a handheld apparatus 31 comprising a display screen as display 32 that displays images to a user and is used for displaying the virtual visual scene 22 to the user 18. The display 32 might be a touch sensitive display that provides at least part of the user input circuitry 32 of the input circuitry 44.

The apparatus 30 may be moved deliberately in the hands of the user 18 in one or more of the previously mentioned six degrees of freedom. The handheld apparatus 31 may house the sensors 45 for determining changes in the real point of view from a change in orientation of the apparatus 30. The handheld apparatus 31 may house the sensors 45 for determining changes in the real point of view from a change in a user-controlled device such as, for example, actuation of buttons, virtual buttons, slider, joystick, etc. The handheld apparatus 31 may be or may be operated as a see-video arrangement for augmented reality that enables a live or recorded video of a real visual scene 12 to be displayed on the display 32 for viewing by the user 18 while one or more visual elements 28 are simultaneously displayed on the display 32 for viewing by the user 18. The combination of the displayed real visual scene 12 and displayed one or more visual elements 28 provides the virtual visual scene 22 to the user 18.

If the handheld apparatus 31 has a camera mounted on a face opposite the display 32, it may be operated as a see-video arrangement that enables a live real visual scene 12 to be viewed while one or more visual elements 28 are displayed to the user 18 to provide in combination the virtual visual scene 22.

FIG. 7B illustrates a head-mounted apparatus 33 comprising a display 32 and/or audio output 32 that renders content to a user 18. The head-mounted apparatus 33 may be moved automatically when a head of the user 18 moves.

A head-mounted apparatus 33 comprising a display 32 may be referred to as a head-mounted display (HMD) device.

A head-mounted apparatus 33 comprising an audio output 32 (e.g. a loudspeaker) may be referred to as a head-mounted audio (HMA) device.

The head-mounted apparatus 33 may house the sensors 44 (not illustrated) for point of view detection that detect a location and orientation of the apparatus 33 or an orientation of the apparatus 33.

The head-mounted apparatus 33 may house the sensors 45 (not illustrated) for gaze direction detection and/or selection gesture detection.

The head-mounted apparatus 33 may be a see-through HMD arrangement for augmented reality that enables a live real visual scene 12 to be viewed while one or more visual elements 28 are displayed by the display 32 to the user 18 to provide in combination the virtual visual scene 22. In this case a visor 34, if present, is transparent or semi-transparent so that the live real visual scene 12 can be viewed through the visor 34.

The head-mounted apparatus 33 may be operated as a see-video arrangement for augmented reality that enables a live or recorded video of a real visual scene 12 to be displayed by the display 32 for viewing by the user 18 while one or more visual elements 28 are simultaneously displayed by the display 32 for viewing by the user 18. The combination of the displayed real visual scene 12 and displayed one or more visual elements 28 provides the virtual visual scene 22 to the user 18. In this case a visor 34 is opaque and may be used as display 32.

Referring back to FIG. 5, an apparatus 30 may enable user-interactive mediation for mediated reality and/or augmented reality and/or virtual reality. The input circuitry 44 detects user actions using user input circuitry 43. These user actions are used by the controller 42 to determine what happens within the virtual visual space 20. This may enable interaction with a visual element 28 within the virtual visual space 20.

The detected user actions may, for example, be gestures performed in the real space 10. Gestures may be detected in a number of ways. For example, depth sensors 49 may be used to detect movement of parts a user 18 and/or or image sensors 47 may be used to detect movement of parts of a user 18 and/or positional/movement sensors attached to a limb of a user 18 may be used to detect movement of the limb. The positional/movement sensors attached to a limb of a user 18 may, for example, be provided in a hand-held controller. Such a hand-held controller might include one or more user actuatable (analog or digital) buttons and/or triggers (which might, for example, provide the user input circuitry 43). A user may provide user input such a hand-held controller by moving the hand-held controller in space and/or by actuating one of more of the buttons or triggers. Examples of such a hand-held controller include the Oculus Touch, the HTC Vive Controller, the PlayStation Move and the Windows Mixed Reality motion controller.

Object tracking may be used to determine when an object or user changes or moves. For example, tracking the object on a large macro-scale allows one to create a frame of reference that moves with the object. That frame of reference can then be used to track time-evolving changes of shape of the object, by using temporal differencing with respect to the object. This can be used to detect small scale human motion such as gestures, hand movement, finger movement, facial movement. These are scene independent user (only) movements relative to the user.

The apparatus 30 may track a plurality of objects and/or points in relation to a user's body, for example one or more joints of the user's body. In some examples, the apparatus 30 may perform full body skeletal tracking of a user's body. In some examples, the apparatus 30 may perform digit tracking of a user's hand.

The tracking of one or more objects and/or points in relation to a user's body may be used by the apparatus 30 in action recognition.

If the apparatus 30 is configured to provide six degrees of freedom (6DoF) mediated reality (virtual reality or augmented reality), the apparatus 30 is configured to track the direction/orientation of the user's point of view 14 in real space 10 in three dimensions (roll, pitch and yaw) and configured to track translational movement of the user in three dimensions (up/down, forward/back and left/right) as the user walks around real space 10. The user's virtual location 23 is associated with and dependent upon the user's real location 13 in real space 10. If the user walks in real space 10 to change his location, the user's virtual location 23 changes in accordance with the mapping between real space 10 and virtual space 20. The extent to which the user's virtual location 13 changes when the user's real location 13 changes depends on the mapping between real space 10 and virtual space 20.

If the apparatus 30 is configured to provide three degrees of freedom (3DoF) mediated reality (virtual reality or augmented reality), the apparatus 30 is configured to track the direction/orientation of the user's point of view 14 in real space 10 in three dimensions (roll, pitch and yaw) but the apparatus 30 does not track translational movement of the user. If the apparatus is configured to provide 3DoF+ mediated reality, the apparatus 30 is configured to track the direction/orientation of the user's point of view 14 in real space 10 in three dimensions (roll, pitch and yaw) but the extent to which the apparatus 30 tracks translational movement of the user in three dimensions (up/down, forward/back and left/right; otherwise known as heave, surge and sway) is more limited than in 6DoF mediated reality. For example, the apparatus 30 may track translational movement of the user's head when the user is sitting down (and/or standing still), but not track the user as the user walks around real space 10. In 3DoF and 3DoF+ mediated reality, the user's virtual location 23 is disassociated from the user's real location 13, such that the user's translation movement within the virtual space 20 (other than, for example, user head movement when in a sitting down or standing up position) is performed by user actions other than walking around, such as via inputs made to one or more handheld controllers, via inputs made to a touch sensitive display or via (other) gesture inputs detected by the input circuitry 44.

Figure 8:
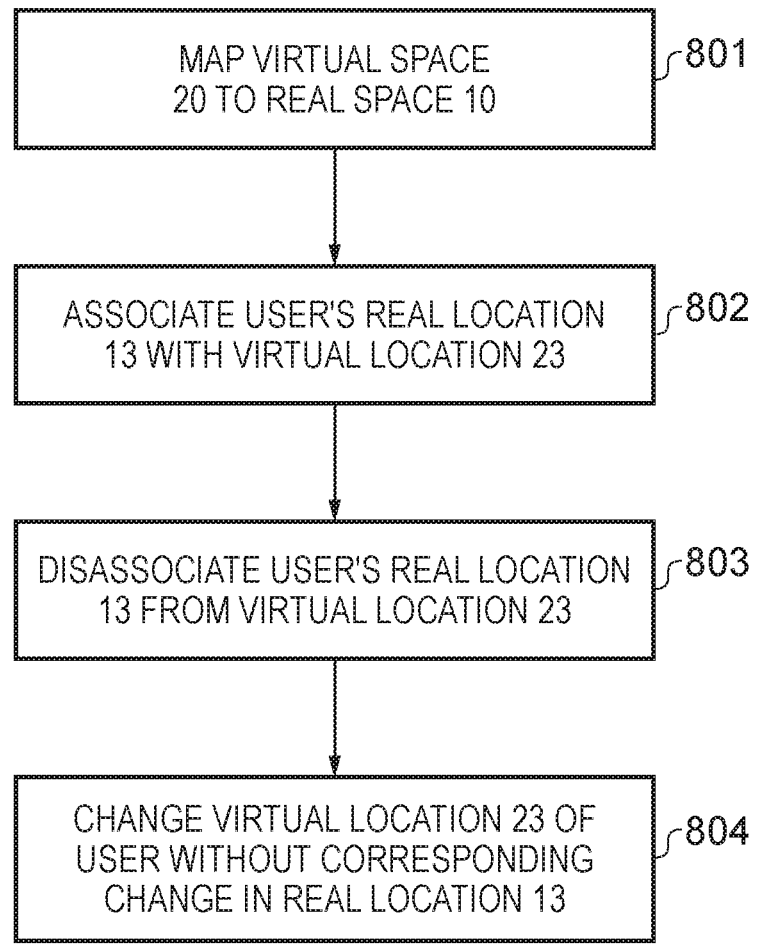
FIG. 8 illustrates a flow chart of a method.

FIG. 8 illustrates a flow chart of a method according to embodiments of the invention. In block 801 in FIG. 8, the processor 40 of the apparatus 30 maps virtual space 20, 90 to real space 10. For example, mediated reality content (such as augmented reality content or virtual reality content) including one or more virtual objects 21, 94 may be mapped to real space 10 such that each virtual location 23 in the virtual space 20, 90 has a corresponding location in real space 10. Every virtual object 21, 94 therefore has a virtual location 23 which corresponds to a real location 13.

In block 802 in FIG. 8, the user's real location 13 is associated with a virtual location 23, such that a change in the user's real location 13 causes a corresponding change in the user's virtual location 23. That is, the apparatus 30 is providing six degrees of freedom (6DoF) mediated reality, tracking the direction/orientation of the user's point of view 14 in real space 10 in three dimensions (roll, pitch and yaw) and tracking translational movement of the user in three dimensions (up/down, forward/back and left/right) as the user walks around the real space 10.

Figure 9:
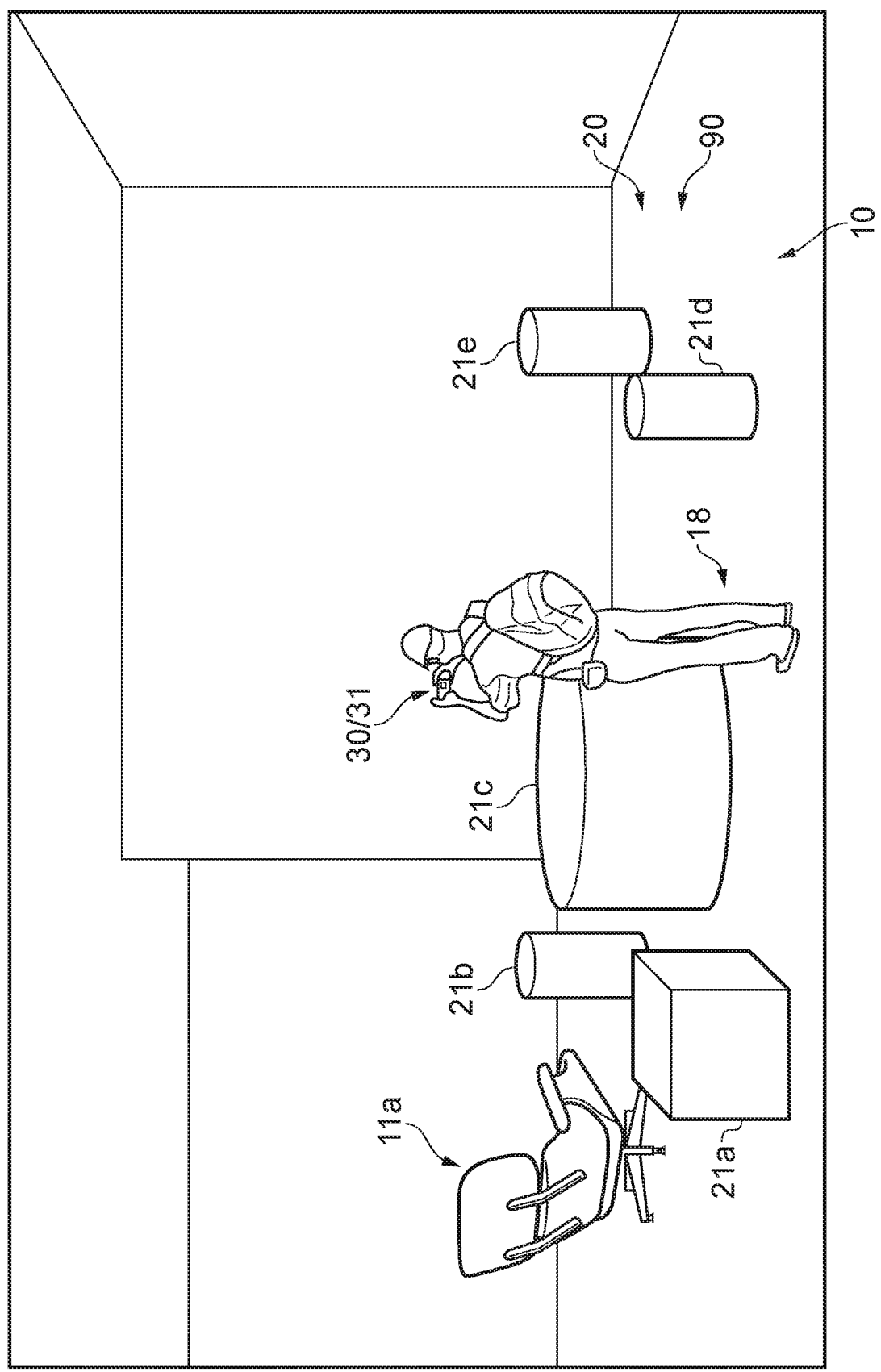
FIG. 9 illustrates a user experiencing a virtual space, which is mapped to a real space, from a first location, where the user's location in the real space determines the user's location in the virtual space.

FIG. 9 illustrates an example in which a virtual space 20, 90 has been mapped to real space 10 and the user 18 is walking around the virtual space 20, 90. In the illustrated example, the apparatus 30 through which the user 18 is experiencing the visual space 20, 90 is a hand-held electronic apparatus 30, but it need not be in other examples. The mediated reality content includes a plurality of virtual visual objects 21a-21e which are illustrated in FIG. 9. Also shown in FIG. 9 is a chair, which is a real object 11a.

Figure 10:
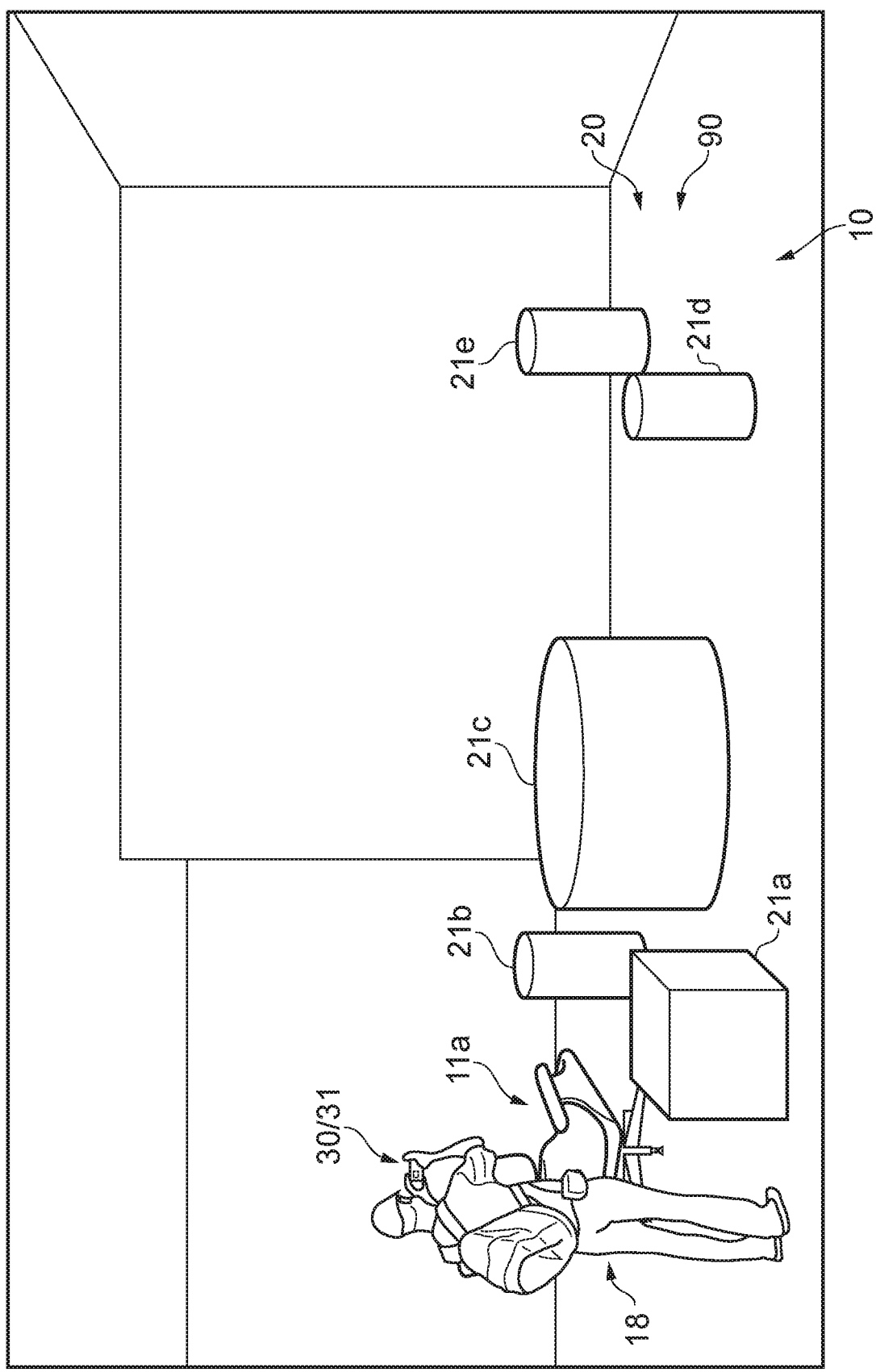
FIG. 10 illustrates a user experiencing the virtual space from a second location.

The user 18 changes his real location 13 in real space 10 from that shown in FIG. 9 to that shown in FIG. 10 (for example, by walking). The user's virtual location 23 in the virtual space 20, 90 is associated with the user's real location 13 and changes in accordance with the mapping between virtual space 20, 90 and real space 10. The user 18 is in a first real location and a first virtual location in FIG. 9 and in a second real location and a second virtual location in FIG. 10, where the first real location is mapped to/associated with the first virtual location and the second real location is mapped to/associated with the second virtual location. The changes in the user's virtual location 23 change the user's perspective of the virtual space 20, 90, providing him with different virtual scenes of the virtual space 20, 90.

In block 803 in FIG. 8, the processor 40 decides to disassociate the user's real location 13 from the user's virtual location 23, based at least in part on at least one user input. For example, the processor 40 may disassociate the user's real location 13 from the user's virtual location 23 by causing the apparatus 30 to switch from providing 6DoF mediated reality to providing 3DoF or 3DoF+ mediated reality. The processor 40 may respond to a user input indicative of a desire (from the user 18) to switch from 6DoF mediated reality to 3DoF or 3DoF+ mediated reality by making that switch.

Figure 11:
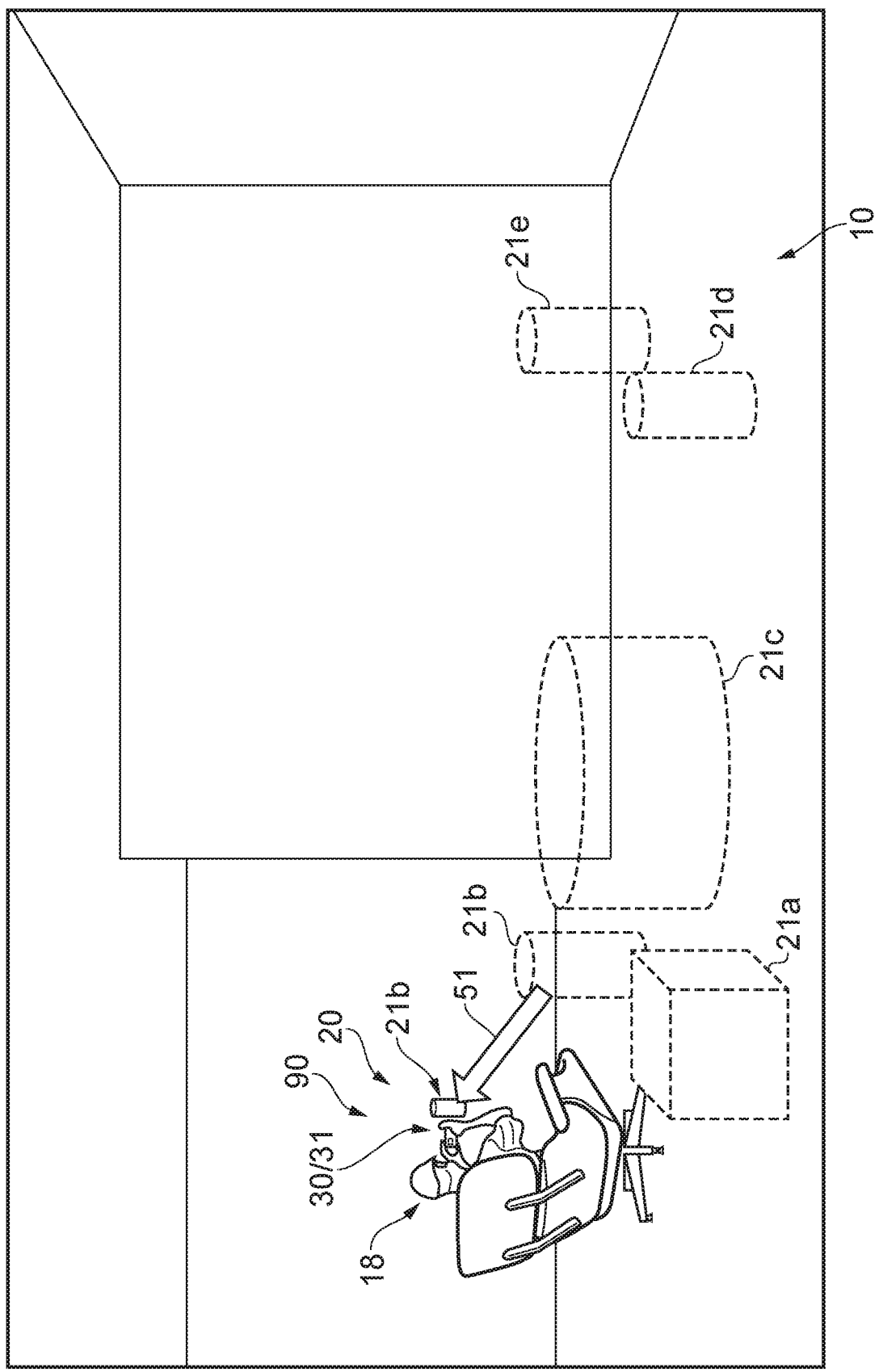
FIG. 11 illustrates the user experiencing the virtual space after disassociation of the user's location in real space from the user's location in virtual space.

In more detail, in some example embodiments of the invention, the user 18 becomes tired as he walks/moves around real space 10 to change his real location 13 and his virtual location 23 (for example, while the apparatus 30 is providing 6DoF mediated reality). In some of these examples, the processor 40 determines, from one or more user inputs provided by the input circuitry 44 (such as from at least one motion sensor of the input circuitry 44), the user 18 has ceased walking. This might be because the user 18 is sitting down, as shown in FIG. 11, or because the user 18 is standing up. It will be appreciated that the input(s) from the input circuitry 44 might not necessarily indicate that the user 18 is substantially stationary (although they might). For example, the user 18 might cease walking but still move his head, which would result in that head movement being tracked by the input circuitry 44 and corresponding inputs being provided to the processor 40 by the input circuitry 44.

Effectively, in these examples, the user ceasing walking acts as a trigger for the processor 40 to disassociate the user's real location 13 from the user's virtual location 23 (for example, by switching from the provision of 6DoF mediated reality to the provision of 3DoF or 3DoF+ mediated reality). In some instances, confirmation from the user 18 might be required to order to effect the disassociation. For example, the processor 40 might cause a prompt/option to be provided to the user 18 (such as via the display 32) to ask the user 18 whether he wishes to dissociate his real location 13 from his virtual location 23 (for example, switch from the provision of 6DoF mediated reality to the provision of 3DoF or 3DoF+ mediated reality). If the user 18 provides user input to confirm this (such as by selecting the option via the user input circuitry 43), the disassociation/switch is performed by the processor 40. In other examples, no such prompt/option is provided to the user 18 and the processor 40 disassociates the user's real location 13 from the user's virtual location 23 automatically (without any further user intervention) when the processor 40 determines that the user 18 has ceased walking.

Alternatively, whether or not the user 18 ceases walking might not have any bearing on the decision to disassociate the user's real location 13 from the user's virtual location 23 (switch from the provision of 6DoF mediated reality to the provision of 3DoF or 3DoF+ mediated reality). For instance, the decision to disassociate the user's real location 13 from the user's virtual location 23 might be made (merely) in response to user input (for example, provided via the user input circuitry 32) indicating a desire from the user 18 to make the disassociation.

When the user's real location 13 is disassociated from the user's virtual location 23, the processor 40 enables the user's virtual location 23 to be changed in a manner that was not possible prior to the disassociation. For example, it may be that prior to the disassociation, translational movement of the user in virtual space 20 beyond a particular threshold distance had to be effected by a change in the user's real location 13. The threshold distance might be the same or different for each of the three translational degrees of freedom (up/down, left/right and forwards/backwards). For example, in order to change his virtual location 23 from a first virtual location to a second virtual location, the user would walk from a first real location (corresponding with the first virtual location) to a second real location (corresponding with the second virtual location).

However, following the disassociation, translational movement of the user's virtual location 23 beyond that/those threshold distances is no longer caused by a change in the user's real location 13. That is, it is no longer possible for the user 18 to cause such a change in the user's virtual location 23 by changing his real location 13 in this manner That is not to say that, in such examples, it is not possible to cause any change in the user's virtual position 23 by changing the user's (tracked) real location 13 when the disassociation occurs; it might merely be that the extent to which the user's virtual position 23 can be changed in this manner is more limited than before the disassociation.

For instance, if the apparatus 30 is a handheld apparatus 31, as shown in FIGS. 7A, 9 to 11, 12A, 15A and 16A, the tracked position of the handheld apparatus 31 might be considered to be the position of the user 18. While the user 18 is sitting down or standing up following the disassociation of the user's real location 13 from the user's virtual location 23 (switch from the provision of 6DoF mediated reality to the provision of 3DoF or 3DoF+ mediated reality), the user 18 can still manipulate the position of the handheld apparatus 31 by translating the handheld apparatus 31 up, down, left, right, forwards and backwards, but to a more limited extent than if he were walking around. Hence, when the disassociation (and 3DoF or 3DoF+ mediated reality is being provided by the handheld apparatus 31) the processor 40 might still respond to translational movement of the handheld apparatus 31 by changing the virtual position 23 of the user 18 in the virtual space 20, provided that the translational movement is within the threshold distance(s) mentioned above. Similar reasoning also applies to embodiments in which the apparatus 30 is a head-mounted apparatus 33 rather than a handheld apparatus 30.

The disassociation of the user's virtual location 23 and the user's real location 13 may advantageously enable the user 18 to explore the virtual space 20 in an unrestricted/less restrictive manner than was the case beforehand prior to the disassociation. For example, the processor 40 might enable the user 18 to view the virtual space 20 from virtual points of view 24 that were not previously accessible prior to the disassociation (when 6DoF mediated reality was being provided).

In block 804 in FIG. 8, the processor 40 changes the user's virtual location 23 without a corresponding change in the user's real location 13, following the disassociation of the user's real location 13 with the user's virtual location 23.

A change in the user's virtual location 23 causes a change in the user's virtual point of view 24, which is partially defined by the user's virtual location 23. A change to the user's virtual point of view 24 changes how the virtual space 20 is mapped to the real space 10.

FIG. 11 illustrates the user 18 sitting in a real chair 11a experiencing the virtual space 20 after disassociation of the user's real location 13 from the user's virtual location 23. The arrow 51 schematically indicates a remapping of the virtual space 20 to the real space 10.

Following the remapping, the user's virtual location 23 in virtual space 20 is located at or adjacent to the virtual object 21b. If the remapping had not occurred, then the virtual object 21b would instead have been positioned to the right of the user 18, as shown in FIG. 11.

In some embodiments of the invention, blocks 803 and 804 in FIG. 8 occur substantially simultaneously, such that the user's virtual location 23 is changed almost immediately after the user's real location 13 is disassociated from the user's virtual location 23. In other embodiments, further user input might be required (for example, via the user input circuitry 43), to cause the change in the user's virtual location 23 to occur in block 804 in FIG. 8 following the disassociation in block 803 in FIG. 8.

Following the change in the user's virtual location 23 to that illustrated in FIGS. 11, 12A and 12B, the user 18 may provide user inputs to further change the user's virtual point of view 24. This is illustrated in FIGS. 12A and 12B. FIG. 12B illustrates a plan view of the virtual space 20, following the change in the user's virtual location 23 to a location at or adjacent to the virtual object 21b. The user inputs might be provided via the user input circuitry 43, which might be provided at least in part by a touch sensitive display, as described above.

Potential further changes to direction/orientation of the user's virtual point of view 24 might involve changes to the orientation/direction of the user's virtual point of view 24 and/or translational movement of the user's virtual location 23 (and therefore the user's virtual point of view 24), as demonstrated by the arrows in FIG. 12A and the arrows 52 in FIG. 12B. Each further change to the user's virtual point of view 24 (each further change in the direction/orientation of the virtual point of the view 24 and each further change in the user's virtual location 23) without a corresponding change in the user's real point of view 14 causes a change to how the virtual space 20 is mapped to the real space 10.

Figure 13:
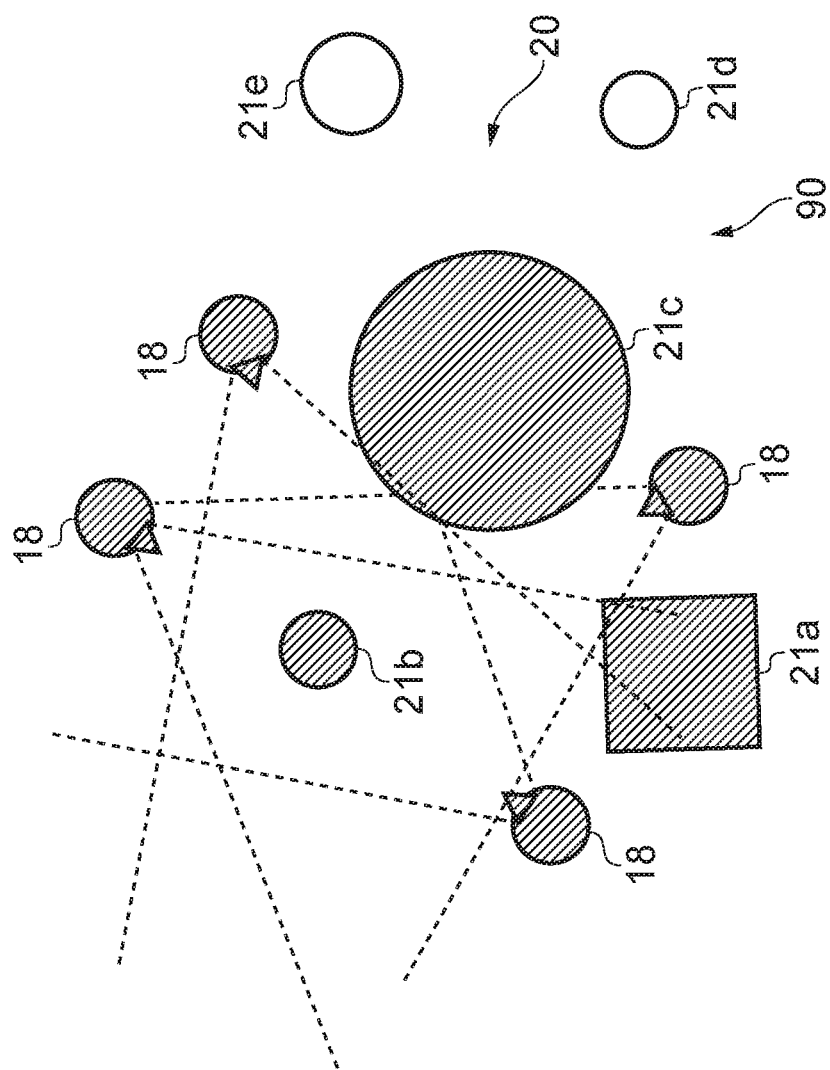
FIG. 13 illustrates a schematic showing a plan view of the user moving around the virtual space and a history of the user's virtual point of view being formed over a period of time.

FIG. 13 schematically illustrates an example as to how the processor 40 might change the user's virtual location 23 in block 804 in FIG. 8 (that is, the processor 40 might remap the virtual space 20 to the real space 10). In the example in FIG. 13, the user 18 moves around the virtual space 20 prior to the disassociation occurring in block 803 in FIG. 8. For example, the user 18 walks around the virtual space 20 while 6DoF mediated reality is being provided by the apparatus 30; the change in the user's real location 13 as the user 18 walks around causes a corresponding change to occur in the user's virtual location 23.

While the user moves around the virtual space 20, the input circuitry 44 tracks the user's real location 13 and the user's virtual location 20. The processor 40 might keep, in the memory 46, a record/history of the user's virtual location 20 (such as by keeping a record of the user's virtual point of view 24) over a period of time, prior to the disassociation in block 803 in FIG. 8. In some examples, the processor 40 might sample the user's virtual location 23/virtual point of view 24 periodically at a set time interval (such as once per second, for instance).

FIG. 13 illustrates the user's virtual point of view 24 at various instances in time while it is being tracked. The processor 40 may be configured to analyze the history of the user's virtual point of view 24 to determine whether a particular portion of the virtual space 20 appears to be of particular interest/the most interest to the user 18 (such as whether one or more of the virtual objects 21a-21e appear to be of particular interest/the most interest to the user 18). This involves analyzing both the history of the user's virtual location 23 in the virtual space 20 and also the orientation/direction of the user's virtual point of view 24. The processor 40 might, for example, compare the history of the user's virtual point of view 24 with the location of one or more virtual objects 21a-21e. In this regard, the processor 40 might determine which virtual objects 21a-21e were viewed by the user 18 and possibly a time period over which those virtual objects 21a-21e were viewed. This might be achieved by analyzing samples of the user's virtual point of view 24 and determining which virtual objects 21a-21e are present within the user's virtual field of view 26 and how often each of those virtual objects 21a-21e are present. The more often a virtual object 21a-21e is present in the user's virtual field of view 26, the more important the virtual object 21a-21e is considered to be to the user 18 by the processor 40.

In the example illustrated in FIG. 11, the processor 40 determines from the history of the user's virtual point of view 24 that the virtual object 21b appears to be of particular interest to the user 18 (and of more interest than the other virtual objects 21a, 21c-21e). Based at least in part on this determination, the processor 40 decides to change the user's virtual location 23 in block 804 in FIG. 8 such that it is at or adjacent to the virtual object 21b in the manner described above. For example, the user's virtual point of view 24 might be changed such that the identified virtual object of interest 21b is positioned in the center of the user's virtual field of view 26. The processor 40 might respond to further user input by rotating the user's virtual point of view 24 around the identified virtual object 21b of interest.

In some examples, the processor 40 might identify multiple virtual objects of interest and the user 18 might be able to provide user input to move between different virtual points of view 24 to view each one of them.

In some examples, after the processor 40 has identified one or more virtual objects of interest, the processor 40 might cause the display 32 to display those virtual objects of interest differently from the virtual objects that were not identified as being of interest. Virtual objects that were not considered to be of interest might be shown slightly blurred, in wireframe, or partially transparent, for example.

Figure 14:
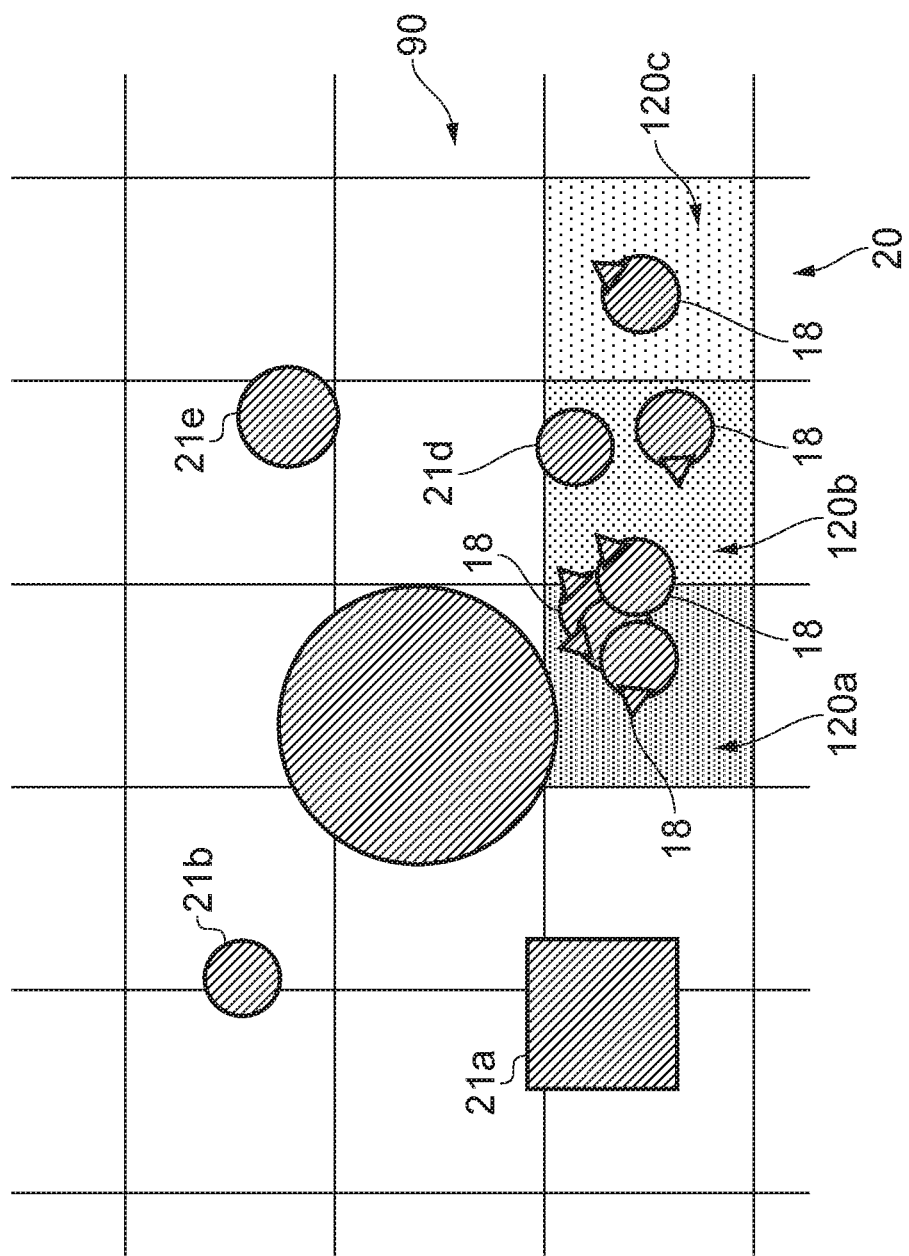
FIG. 14 illustrates a schematic of a plan view of the user moving around the virtual space and a history of the user's virtual location being formed over a period of time.

FIG. 14 illustrates a different example as to how the processor 40 might decide how to change the user's virtual location 23 in block 804 in FIG. 8. The user's virtual location 23 is shown at various instances in time in FIG. 14. In the example of FIG. 14, as in the example of FIG. 13, the user 18 moves around the virtual space 20 prior to the disassociation occurring in block 803 in FIG. 8. For example, the user 18 walks around the virtual space 20 while 6DoF mediated reality is being provided by the apparatus 30; the change in the user's real location 13 as the user 18 walks around causes a corresponding change to occur in the user's virtual location 23.

While the user moves around the virtual space 20, the input circuitry 44 tracks the user's real location 13 and the user's virtual location 23. The processor 40 might keep, in the memory 46, a record/history of the user's virtual location 20 over a period of time without keeping a record of the orientation/direction of the user's virtual point of view 24.

FIG. 14 illustrates the user's virtual location 23 at various instances in time while it is being tracked. The processor 40 may be configured to analyze the history of the user's virtual location 13 to determine whether a particular portion of the virtual space 20 appears to be of a particular interest to the user 18. In this regard, the processor 40 might segment the virtual space 20, 90 into a plurality of segments and determine whether the user 18 spent more time in a particular segment of virtual space 20, 90 than others. This might be done, for example, by analyzing samples of the user's virtual location 23. In FIG. 14, the user 18 spent no time at all in some segments of virtual space 20, 90. He spent some time in the segment labelled with the reference numeral 120c, more time in the segment labelled with the reference numeral 120b, and the most time in the segment labelled with the reference numeral 120a. The processor 40 might therefore determine that the segment 120a is the segment of virtual space 20, 90 that is of most interest to the user 18. Based at least in part on this determination, the processor 40 decides to change the user's virtual location 23 in block 804 in FIG. 8 such that it is in the segment of interest 120a.

FIG. 15A illustrates a virtual visual scene 22 of the virtual space 20, 90 being displayed on the display 32 of the apparatus 30 after the user's virtual location 23 has been changed in block 804 in FIG. 8 such that it is in the segment of interest 120a. FIG. 15B illustrates a plan view of the virtual space 20, 90 in which the virtual location 23 of the user 18 is shown relative to the virtual objects 21a-21e in the virtual space 20, 90.

In some implementations, the processor 40 might decide how to orient the user's virtual point of view 24 when the user's virtual location 23 is changed in block 804 in FIG. 8. The orientation might depend upon which orientation the user 18 spent the most time in while in the segment of interest 120. For example, the user's most common orientation when in the segment of interest 120 might be the orientation into which the user's virtual point of view 24 is reoriented when the user's virtual location 23 is changed in block 804 in FIG. 8. In these implementations, the user's virtual point of view 24 is tracked so that its history can be analyzed by the processor 40.

Following the change in the user's virtual location 23 to that illustrated in FIGS. 15A and 15B, the user 18 may provide user inputs to further change the user's virtual point of view 24 in the same manner as that discussed above in relation to FIGS. 12A to 13. FIG. 16A illustrates a situation in which the user is in the process of providing a user input at a touch sensitive display 32 of the apparatus 30 in order to change the user's virtual point of view 24. In the illustrated example, the user's virtual point of view 24 has been changed by changing the direction/orientation of the user's virtual point of view 24 but not the user's virtual location 23. In this regard, it can be seen from the plan view of the virtual space 20, 90 in FIG. 16B that the user's virtual location 23 is the same as it is in FIG. 15B. It possible for the user 18 to provide user inputs (for example, at the touch sensitive display 32) to further change the user's point of view 24 by changing the user's virtual location 23.

In some examples, the processor 40 might identify multiple virtual locations 23/virtual points of view 24 and the user 18 might be able to provide user input to move between them.

Figure 12:
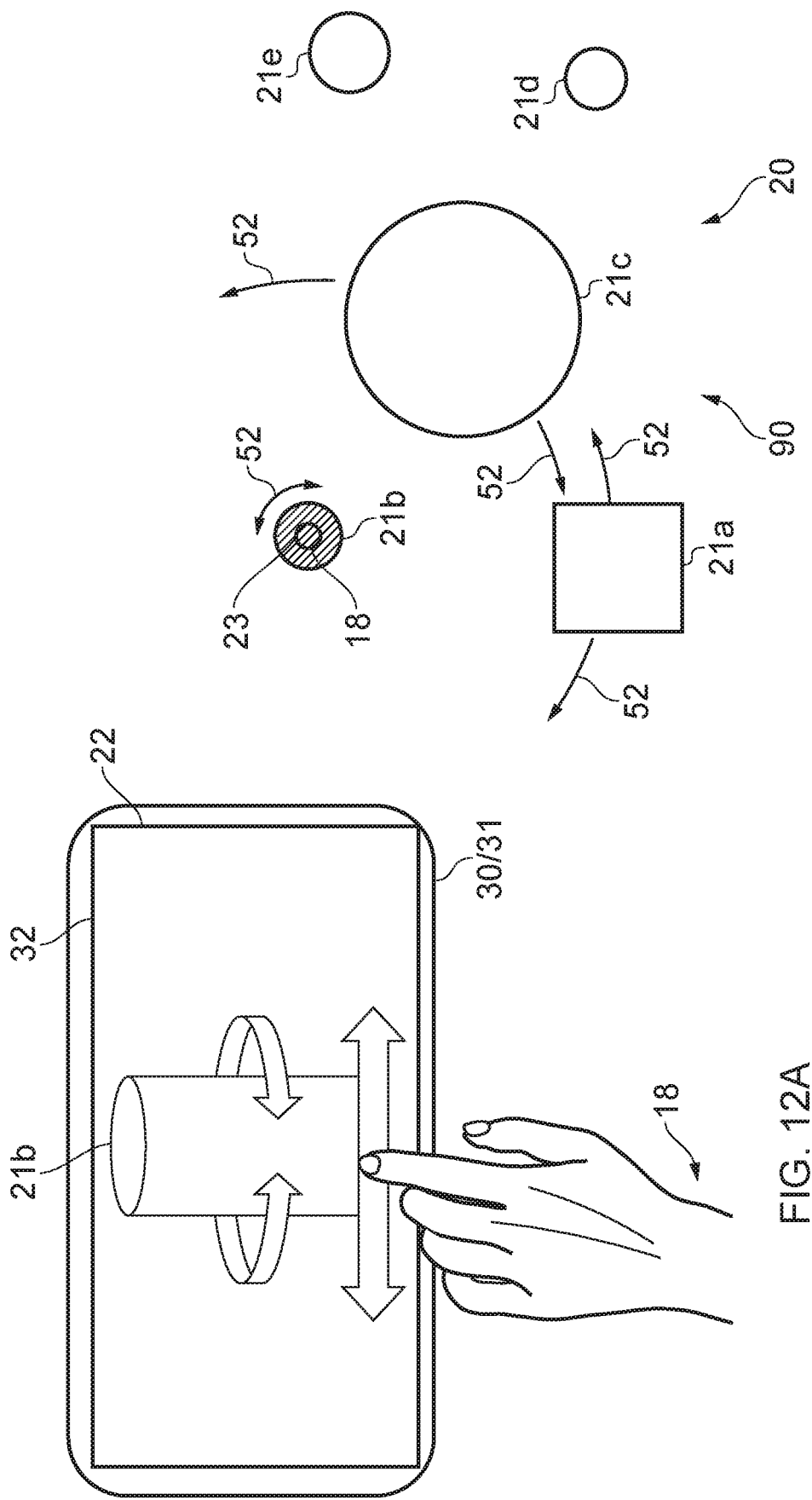
FIG. 12A illustrates a display of an apparatus displaying a virtual scene of the virtual space from a location indicated in the plan view of the virtual space illustrated in FIG. 12B.

It should be understood that the technique described above for deciding how to change the user's virtual point of view 24 in relation to FIGS. 12A to 13 could be combined with that described in FIGS. 14 to 15B. For example, the amount of time that the user 18 has spent in particular virtual locations 23 might be used to determine where to reposition the user's virtual location 23 (as per FIGS. 14 to 15B), and the amount of time that the user 18 has been viewing each virtual object 21a-21e might be used to determine how to re-orient the user's point of view 24 when the user's virtual location 23 is changed (as per FIGS. 12A to 13).

In some embodiments of the invention, rather than the change in the user's virtual location 23/virtual point of view 24 in block 804 in FIG. 8 being based on a history of the user's virtual location 23 or virtual point of view 24 (as is the case above in the embodiments described in relation to FIGS. 9 to 16B), the user's virtual location 23/virtual point of view 24 might be remapped in block 804 to a particular, predefined virtual location 23/virtual point of view 24 that is stored in the memory 46. The predefined virtual location 23/virtual point of view 24 might be predefined before the user 18 begins to experience the virtual space 20, 90 and it might or might not be user configurable. For example, the predefined virtual location 23/virtual point of view 24 might be defined by the creator of mediated reality content. After the user's virtual location 23/virtual point of view 24 has been remapped in block 804 in FIG. 8, the user 18 might be able to further change his virtual location 23/virtual point of view 24 by providing (further) user input in the manner described above.

It was explained above the processor 40 may disassociate the user's real location 13 from the user's virtual location 23 by causing the apparatus 30 to switch from providing 6DoF mediated reality to providing 3DoF or 3DoF+ mediated reality. In some examples, the processor 40 may disassociate the user's real location 13 from the user's virtual location 23 by causing the apparatus 30 to switch from providing 6DoF mediated reality to providing 0DoF mediated reality in which movement of the user is no longer tracked. Example embodiments therefore enable consumption of 6DoF mediated reality content in 0DoF, 3DoF and/or 3DoF+ with a meaningful user experience.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

Where a structural feature has been described, it may be replaced by means for performing one or more of the functions of the structural feature whether that function or those functions are explicitly or implicitly described.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one." or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although embodiments have been described in the preceding paragraphs with reference to various examples, it should be appreciated that modifications to the examples given can be made without departing from the scope of the claims. For example, the apparatus 30 might not be (or might not comprise) a handheld electronic device that comprises a display. It might not be (or might not comprise) or a head mounted device comprising a display. It might instead be or comprise a hovering drone comprising a display. While embodiments of the invention have been described above in relation to FIGS. 9 to 16B in the context of a virtual space 20, 90 that includes at least a virtual visual space 20, it will be appreciated from the description above that the virtual space 20, 90 could be a combined virtual visual space 20 and virtual aural space 90, or it could instead consist of a virtual visual space 20 (with no virtual aural space 90), or it could instead consist of a virtual aural space 90 with no virtual visual space 20.

Features described in the preceding description may be used in combinations other than the combinations explicitly described above.

Although functions have been described with reference to certain features, those functions may be performable by other features whether described or not.

Although features have been described with reference to certain embodiments, those features may also be present in other embodiments whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer and exclusive meaning.

The presence of a feature (or combination of features) in a claim is a reference to that feature) or combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Whilst endeavoring in the foregoing specification to draw attention to those features believed to be of importance it should be understood that the applicant may seek protection via the claims in respect of any patentable feature or combination of features hereinbefore referred to and/or shown in the drawings whether or not emphasis has been placed thereon.

The invention claimed is:

1. An apparatus comprising at least one processor and at least one memory, wherein the at least one memory store computer program instructions for execution by the at least one processor, and wherein the computer program instructions are configured, when executed by the at least one processor, to cause the apparatus to perform at least:
   mapping a virtual space to a real space;
   associating a user's real location in the real space with a virtual location of the user in the virtual space, such that a change in the user's real location causes a corresponding change in the user's virtual location;
   disassociating the user's real location with the user's virtual location, based at least in part on at least one user input;
   tracking the user's virtual location over a period of time prior to the disassociation of the user's real location with the user's virtual location, wherein a history of the user's virtual location is formed, at least in part, from tracking the user's virtual location over the period of time;
   determining which portions of the virtual space are of particular interest to the user by analyzing the history of the user's virtual location; and
   changing, following disassociation of the user's real location with the user's virtual location, the user's virtual location without a corresponding change in the user's real location, wherein the change in the user's virtual location, following the disassociation of the user's real location with the user's virtual location, is based at least in part on the portions of the virtual space determined to be of particular interest to the user.

2. The apparatus of claim 1, wherein the change in the user's virtual location, following the disassociation of the user's real location with the user's virtual location, is based at least in part on a history of the user's virtual point of view prior to the disassociation.

3. The apparatus of claim 2, wherein the computer program instructions are configured, when executed by the at least one processor, to cause the apparatus to track the user's virtual point of view prior to the disassociation of the user's real location with the user's virtual location, and the history of the user's virtual point of view is formed, at least in part, by tracking the user's virtual point of view over the period of time.

4. The apparatus of claim 1, wherein the computer program instructions are further configured, when executed by the at least one processor, to cause the apparatus to track virtual objects viewed by the user in the virtual space, wherein the change in the user's virtual location, following the disassociation of the user's real location with the user's virtual location, is based at least in part on which one or more virtual objects were viewed by the user prior to the disassociation.

5. The apparatus of claim 4, wherein the change in the user's virtual location is based at least in part on a time period over which one or more virtual objects were viewed by the user prior to the disassociation.

6. The apparatus of claim 1, wherein the change in the user's virtual location, following the disassociation of the user's real location with the user's virtual location, is based at least in part on user input provided after the disassociation.

7. The apparatus of claim 1, wherein the computer program instructions are further configured, when executed by the at least one processor, to cause the apparatus to cause an option to be provided to enable the user to choose to disassociate the user's real location with the user's virtual location, wherein the decision to disassociate the user's real location with the user's virtual location is based at least in part on user selection of the option.

8. The apparatus of claim 1, wherein a decision to disassociate the user's real location with the user's virtual location is based, at least in part, on at least one user input from at least one motion sensor indicating that the user has ceased walking.

9. The apparatus of claim 1, wherein the computer program instructions are further configured, when executed by the at least one processor, to cause the apparatus to enable, following disassociation of the user's real location with the user's virtual location and the change in the user's virtual location without a corresponding change in the user's real location, the user to further change the user's virtual location by providing user input without a corresponding further change in the user's real location.

10. The apparatus of claim 1, further comprising at least one display for displaying a virtual visual scene of the virtual space.

11. A method, comprising:
   mapping a virtual space to a real space;
   associating a user's real location in the real space with a virtual location of the user in the virtual space, such that a change in the user's real location causes a corresponding change in the user's virtual location;
   disassociating the user's real location with the user's virtual location, based at least in part on at least one user input;
   tracking the user's virtual location over a period of time prior to the disassociation of the user's real location with the user's virtual location, wherein a history of the user's virtual location is formed, at least in part, from tracking the user's virtual location over the period of time;

determining which portions of the virtual space are of particular interest to the user by analyzing the history of the user's virtual location; and changing, following disassociation of the user's real location with the user's virtual location, the user's virtual location without a corresponding change in the user's real location, wherein the change in the user's virtual location, following the disassociation of the user's real location with the user's virtual location, is based at least in part on the portions of the virtual space determined to be of particular interest to the user.

12. The method of claim 11, wherein the change in the user's virtual location, following the disassociation of the user's real location with the user's virtual location, is based at least in part on a history of the user's virtual point of view prior to the disassociation.

13. The method of claim 12, wherein the history of the user's virtual point of view is formed, at least in part, from tracking the user's virtual point of view over the period of time.

14. The method of claim 11, further comprising: tracking virtual objects viewed by the user in the virtual space, wherein the change in the user's virtual location, following the disassociation of the user's real location with the user's virtual location, is based at least in part on which one or more virtual objects were viewed by the user prior to the disassociation.

15. The method of claim 14, wherein the change in the user's virtual location is based at least in part on a time period over which one or more virtual objects were viewed by the user prior to the disassociation.

16. The method of claim 11, wherein the change in the user's virtual location, following the disassociation of the user's real location with the user's virtual location, is based at least in part on user input provided after the disassociation.

17. The method of claim 11, further comprising: causing an option to be provided to enable the user to choose to disassociate the user's real location with the user's virtual location, wherein the decision to disassociate the user's real location with the user's virtual location is based at least in part on user selection of the option.

18. The method of claim 11, wherein a decision to disassociate the user's real location with the user's virtual location is based, at least in part, on at least one user input from at least one motion sensor indicating that the user has ceased walking.

19. The method of claim 11, further comprising: enabling, following disassociation of the user's real location with the user's virtual location and the change in the user's virtual location without a corresponding change in the user's real location, the user to further change the user's virtual location by providing user input without a corresponding further change in the user's real location.

20. A non-transitory computer readable medium storing computer program instructions that, when performed by at least one processor of an apparatus, cause the apparatus to perform:

mapping a virtual space to a real space;

associating a user's real location in the real space with a virtual location of the user in the virtual space, such that a change in the user's real location causes a corresponding change in the user's virtual location;

disassociating the user's real location with the user's virtual location, based at least in part on at least one user input;

tracking the user's virtual location over a period of time prior to the disassociation of the user's real location with the user's virtual location, wherein a history of the user's virtual location is formed, at least in part, from tracking the user's virtual location over the period of time;

determining which portions of the virtual space are of particular interest to the user by analyzing the history of the user's virtual location; and changing, following disassociation of the user's real location with the user's virtual location, the user's virtual location without a corresponding change in the user's real location, wherein the change in the user's virtual location, following the disassociation of the user's real location with the user's virtual location, is based at least in part on the portions of the virtual space determined to be of particular interest to the user.

* * * * *